(12) United States Patent
Kato

(10) Patent No.: US 10,880,832 B2
(45) Date of Patent: Dec. 29, 2020

(54) WIRELESS BASE STATION, WIRELESS COMMUNICATION SYSTEM, AND BASE STATION ALLOCATION METHOD

(71) Applicant: Panasonic Intellectual Property Management Co., Ltd., Osaka (JP)

(72) Inventor: Osamu Kato, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 66 days.

(21) Appl. No.: 15/532,361

(22) PCT Filed: Nov. 27, 2015

(86) PCT No.: PCT/JP2015/005891
§ 371 (c)(1),
(2) Date: Jun. 1, 2017

(87) PCT Pub. No.: WO2016/098292
PCT Pub. Date: Jun. 23, 2016

(65) Prior Publication Data
US 2017/0325165 A1 Nov. 9, 2017

(30) Foreign Application Priority Data
Dec. 15, 2014 (JP) .................................. 2014-253375

(51) Int. Cl.
*H04W 72/04* (2009.01)
*H04W 64/00* (2009.01)
(Continued)

(52) U.S. Cl.
CPC ....... *H04W 52/0225* (2013.01); *H04W 48/14* (2013.01); *H04W 48/16* (2013.01);
(Continued)

(58) Field of Classification Search
CPC combination set(s) only.
See application file for complete search history.

(56) References Cited

U.S. PATENT DOCUMENTS 9,615,376 B2    4/2017  Kato
2012/0142387 A1*  6/2012  Kano ................ H04W 36/0016
                                              455/509
(Continued)

FOREIGN PATENT DOCUMENTS

JP    2008-258666 A    10/2008
JP    2013-162377 A     8/2013
(Continued)

OTHER PUBLICATIONS

International Search Report, dated Feb. 2, 2016, for corresponding International Application No. PCT/JP2015/005891, 4 pages.
(Continued)

*Primary Examiner* — Kodzovi Acolatse
*Assistant Examiner* — The Hy Nguyen
(74) *Attorney, Agent, or Firm* — Seed IP Law Group LLP

(57) ABSTRACT

A wireless base station extracts a connection base station from a plurality of other wireless base stations, as a candidate of a wireless base station which communicates user data with a wireless communication terminal, based on positional information of the wireless communication terminal, information of a wireless communication method capable of being employed by the wireless communication terminal, information of ranges in which the other wireless base stations are able to communicate, and information of wireless communication methods capable of being employed by the other wireless base stations.

16 Claims, 11 Drawing Sheets

(51) Int. Cl.
*H04W 88/02* (2009.01)
*H04W 88/08* (2009.01)
*H04W 52/02* (2009.01)
*H04W 48/16* (2009.01)
*H04W 48/14* (2009.01)

(52) U.S. Cl.
CPC ....... *H04W 64/00* (2013.01); *H04W 72/0406* (2013.01); *H04W 72/048* (2013.01); *H04W 88/02* (2013.01); *H04W 88/08* (2013.01); *Y02D 30/70* (2020.08)

(56) References Cited

U.S. PATENT DOCUMENTS

| | | | | |
|---|---|---|---|---|
| 2012/0250621 | A1* | 10/2012 | Takamura | H04W 28/26 370/328 |
| 2014/0179326 | A1* | 6/2014 | Cho | H04W 72/04 455/445 |
| 2015/0003417 | A1 | 1/2015 | Akiyoshi et al. | |
| 2015/0043504 | A1* | 2/2015 | Kato | H04W 72/10 370/329 |
| 2015/0133141 | A1* | 5/2015 | Song | H04W 72/0406 455/452.2 |
| 2015/0334705 | A1* | 11/2015 | Zhao | H04W 36/22 370/329 |
| 2016/0205693 | A1* | 7/2016 | Lu | H04W 48/18 370/329 |

FOREIGN PATENT DOCUMENTS

| | | | |
|---|---|---|---|
| JP | 2013-232815 A | 11/2013 | |
| JP | 2014-096779 A | 5/2014 | |
| WO | WO-2013161264 A1 * | 10/2013 | ............ H04W 72/10 |
| WO | WO-2014020560 A1 * | 2/2014 | ............ H04W 48/18 |

OTHER PUBLICATIONS

Nakao et al., "Activities on heterogeneous networks for 5G :—C-plane/U-plane Splitting Control in Heterogeneous Networks," IEICE Technical Report, The Institute of Electronics, Information and Communication Engineers, Oct. 2014, 8 pages. (With Partial Translation).

NTT DOCOMO, Inc., DOCOMO 5G White Paper, 5G Radio Access: Requirements, Concept, and Technologies, Jul. 2014, 27 pages.

Seiichi Sampei, "A Study on Technical Directions of Wireless Access and Networking for 5G Cellular Systems," IEICE Technical Report, The Institute of Electronics, Information and Communication Engineers, Oct. 2014, 8 pages. (With Partial Translation).

* cited by examiner

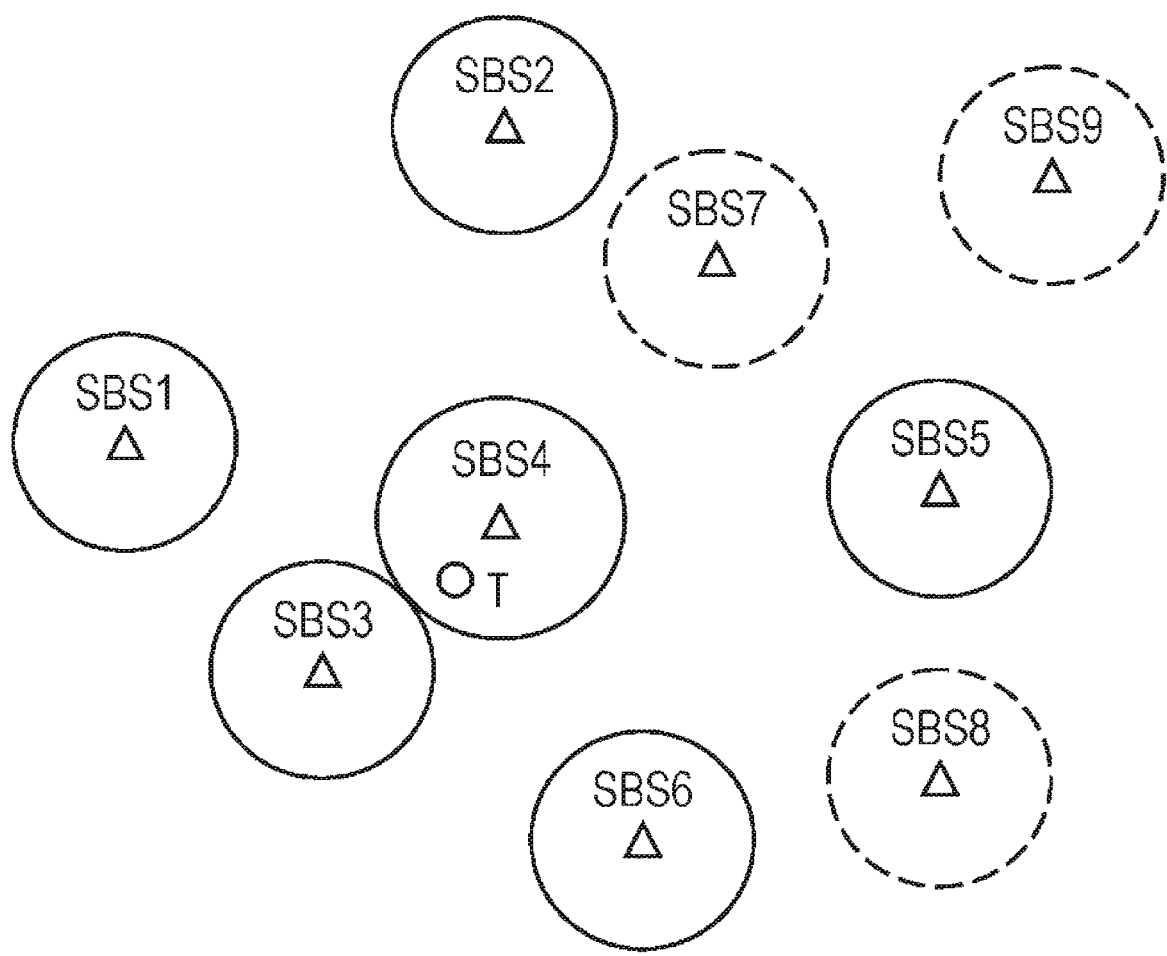

WIRELESS BASE STATION, WIRELESS COMMUNICATION SYSTEM, AND BASE STATION ALLOCATION METHOD

TECHNICAL FIELD

The present disclosure relates to a wireless base station, a wireless communication system, and a base station allocation method.

BACKGROUND ART

In recent years, in a wireless communication system in which terminals and wireless base stations are connected to a network, a heterogeneous network has been examined (for example, see NPL 1 to NPL 3). NPL 1 to NPL 3 describe a technology (C/U splitting) in which the base stations are split into the base station that uses a control signal (C-plane) and the base station that uses a data signal (U-plane) in the heterogeneous network.

CITATION LIST

Non Patent Literature

NPL 1: Seigo Nakao, Tetsuya Yamamoto, Shozo Okasaka, and Hidetoshi Suzuki, "Activities on heterogeneous networks for 5G—C-plane/U-plane Splitting Control in Heterogeneous Networks," IEICE Technical Report, The Institute of Electronics, Information and Communication Engineers, October 2014, pp. 83-88

NPL 2: Sampei Seiichi, "A Study on Technical Directions of Wireless Access and Networking for 5G Cellular Systems," IEICE Technical Report, The Institute of Electronics, Information and Communication Engineers, October 2014, pp. 153-158

NPL 3: "DOCOMO 5G white Paper, requirements and technical concepts in 5G radio access after 2020," NTT DoCoMo, Inc., September 2014, pp. 1-14

SUMMARY OF THE INVENTION

In the technology described in NPL1 to NPL 3, it is difficult to reduce power consumption of the terminal when the wireless base station equipment to be connected to the terminal is searched for.

The present disclosure has been made in view of such circumstances, and provides a wireless base station, a wireless communication system, and a base station allocation method which are capable of reducing power consumption of a wireless communication terminal when the wireless base station to be connected to the wireless communication terminal is searched for.

A wireless base station of the present disclosure is a wireless base station that communicates control data with a wireless communication terminal, and retains positional information items of a plurality of other wireless base stations. The wireless base station includes: a receiver that receives positional information of the wireless communication terminal and information of a wireless communication method capable of being employed by the wireless communication terminal; an extractor that extracts a connection base station which communicates user data with the wireless communication terminal from the plurality of other wireless base stations based on the positional information of the wireless communication terminal, the information of the wireless communication method capable of being employed by the wireless communication terminal, information of ranges in which the other wireless base stations are able to communicate, and information of wireless communication methods capable of being employed by the other wireless base stations; and a transmitter that transmits information of the connection base station to the wireless communication terminal.

A wireless communication system of the present disclosure is a wireless communication system that includes a wireless communication terminal, a first wireless base station capable of communicating control data with the wireless communication terminal, and a plurality of second wireless base stations capable of communicating user data with the wireless communication terminal. The wireless communication terminal includes a first detector that detects the first wireless base station, a second detector that detects positional information of the wireless communication terminal, and a communicator that transmits positional information of the wireless communication terminal and information of a wireless communication method capable of being employed by the wireless communication terminal, receives information of a connection base station which communicates user data with the wireless communication terminal, and communicates the user data with the connection base station. The first wireless base station includes a receiver that receives the positional information of the wireless communication terminal and the information of the wireless communication method capable of being employed by the wireless communication terminal, an extractor that extracts the connection base station from the plurality of second wireless base stations based on the positional information of the wireless communication terminal, the information of the wireless communication method capable of being employed by the wireless communication terminal, information of ranges in which the second wireless base stations are able to communicate, and information of wireless communication methods capable of being employed by the second wireless base stations, and a transmitter that transmits information of the connection base station to the wireless communication terminal. The connection base station includes a communicator which communicates the user data with the wireless communication terminal.

A base station allocation method of the present disclosure is a base station allocation method in a wireless base station that communicates control data with a wireless communication terminal and retains positional information items of a plurality of other wireless base stations. The method includes: receiving positional information of the wireless communication terminal and information of a wireless communication method capable of being employed by the wireless communication terminal; extracting a connection base station which communicates user data with the wireless communication terminal from the plurality of other wireless base stations based on the positional information of the wireless communication terminal, the information of the wireless communication method capable of being employed by the wireless communication terminal, information of ranges in which the other wireless base stations are able to communicate, and information of wireless communication methods capable of being employed by the other wireless base stations; and transmitting information of the connection base station to the wireless communication terminal.

According to the present disclosure, it is possible to reduce power consumption of the wireless communication terminal when the wireless base station equipment to be connected to the wireless communication terminal is searched for.

BRIEF DESCRIPTION OF DRAWINGS

FIG. 12 is a schematic diagram showing an example of the positional relationship between the small cell base station and the terminal according to the second exemplary embodiment.

DESCRIPTION OF EMBODIMENTS

Hereinafter, exemplary embodiments of the present invention will be described with reference to the drawings. (Background of Exemplary Embodiments of Present Invention)

For example, in a C/U splitting heterogeneous network of the related art, in a case where a terminal searches for a wireless base station equipment that uses U-plane, it is necessary for the terminal to search for the wireless base station equipment by using a plurality of types of wireless communication methods. Thus, it is difficult to reduce power consumption of the terminal.

Hereinafter, a wireless base station, a wireless communication system, and a base station allocation method which are capable of reducing power consumption of a wireless communication terminal when the wireless base station to be connected to the wireless communication terminal is searched for will be described.

First Exemplary Embodiment

Figure 1:
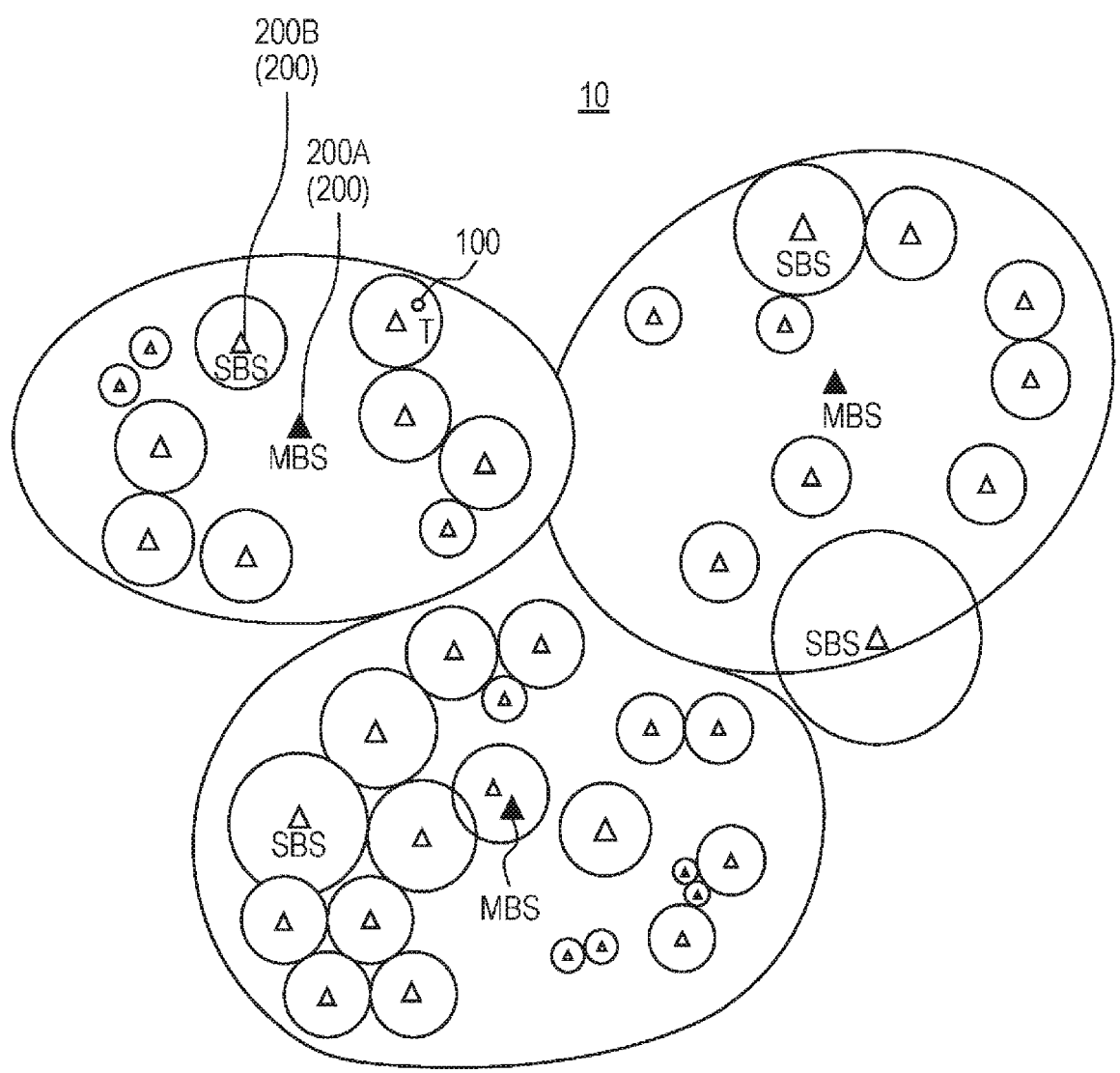
FIG. 1 is a schematic diagram showing a configuration example of a wireless communication system according to a first exemplary embodiment.

FIG. 1 is a block diagram showing a configuration example of wireless communication system 10 of a first exemplary embodiment. Wireless communication system 10 includes one or more terminals 100 and one or more base stations 200. Terminal 100 and base station 200 are connected to through a wireless link. Terminal 100 is an example of the wireless communication terminal, and base station 200 is an example of the wireless base station.

Wireless communication system 10 is a heterogeneous network in which base station 200 to which terminal 100 is to be connected has various wireless standards, and terminal 100 communicates with base station 200. In the heterogeneous network, different wireless communication methods (for example, radio access technologies (RATs)) or base stations 200 having different cell radii coexist. For example, in the heterogeneous network, a plurality of types of wireless standards coexist, and base stations 200 having different cell radii overlap each other in the whole area. For example, the RAT includes information such as a wireless communication standard or a radio frequency.

The heterogeneous network is a C/U splitting network. That is, in wireless communication system 10, communication regarding control data and communication regarding user data are performed by different base stations 200.

Base station 200 includes a macrocell base station 200A that mainly communicates control data (for example, data regarding control (C)-plane) with terminal 100, and a small cell base station 200B that mainly communicates user data (for example, data regarding user (U)-plane) with terminal 100. For example, the user data may include image data (for example, moving image or still image) or voice data, and may include a large amount of data. Macrocell base station 200A is an example of a first wireless base station, and small cell base station 200B is an example of a second wireless base station.

The C-plane is a communication protocol for communicating control data in call connection or wireless resource allocation of wireless communication. The U-plane is a communication protocol for actually communicating (for example, video communication, voice communication, or data communication) by using the allocated wireless resource between terminal 100 and base station 200.

The cell radius of macrocell base station 200A is, for example, 1 km to several km, and is comparatively large. For example, one type (for example, LTE) is used as the RAT capable of being employed by macrocell base station 200A. The cell radius is equivalent to a maximum transmission distance of base station 200.

The cell radius of small cell base station 200B is, for example, 10 m to 100 m, and is comparatively small. The RAT capable of being employed by small cell base station 200B is various, and a plurality of types is present. For example, the cell radius may be 100 m or more in the mountains, desert regions, or woodland, and may be larger than the cell radius of macrocell base station 200A. That is, macrocell base station 200A and small cell base station 200B are distinguished irrespective of the magnitude of the cell radius.

In FIG. 1, "MBS" denotes macrocell base station 200A, "SBS" denotes small cell base station 200B, and "T" denotes terminal 100. A line surrounding macrocell base station 200A shows an image of a range in which communication using macrocell base station 200A is able to be performed. A line surrounding small cell base station 200B shows an image of a range in which communication using small cell base station 200B is able to be performed. For example, a range in which base station 200 can communicate is determined depending on a cell radius and a position of base station 200.

Terminal 100 and base station 200 set the RAT to be used in communication from the RATs (for example, wireless communication standards or radio frequencies) capable of being employed by the devices, and perform wireless communication according to the set RATs. Terminals 100 and base stations 200 can employ one or more RATs.

The wireless communication standard includes, for example, Long-Term Evolution (LTE), a wireless local area network (LAN), the Digital Enhanced Cordless Telecommunications (DECT), 3rd generation mobile communication system (3G), 4th generation mobile communication system (4G), and a 5th generation mobile communication system (5G).

Figure 2:
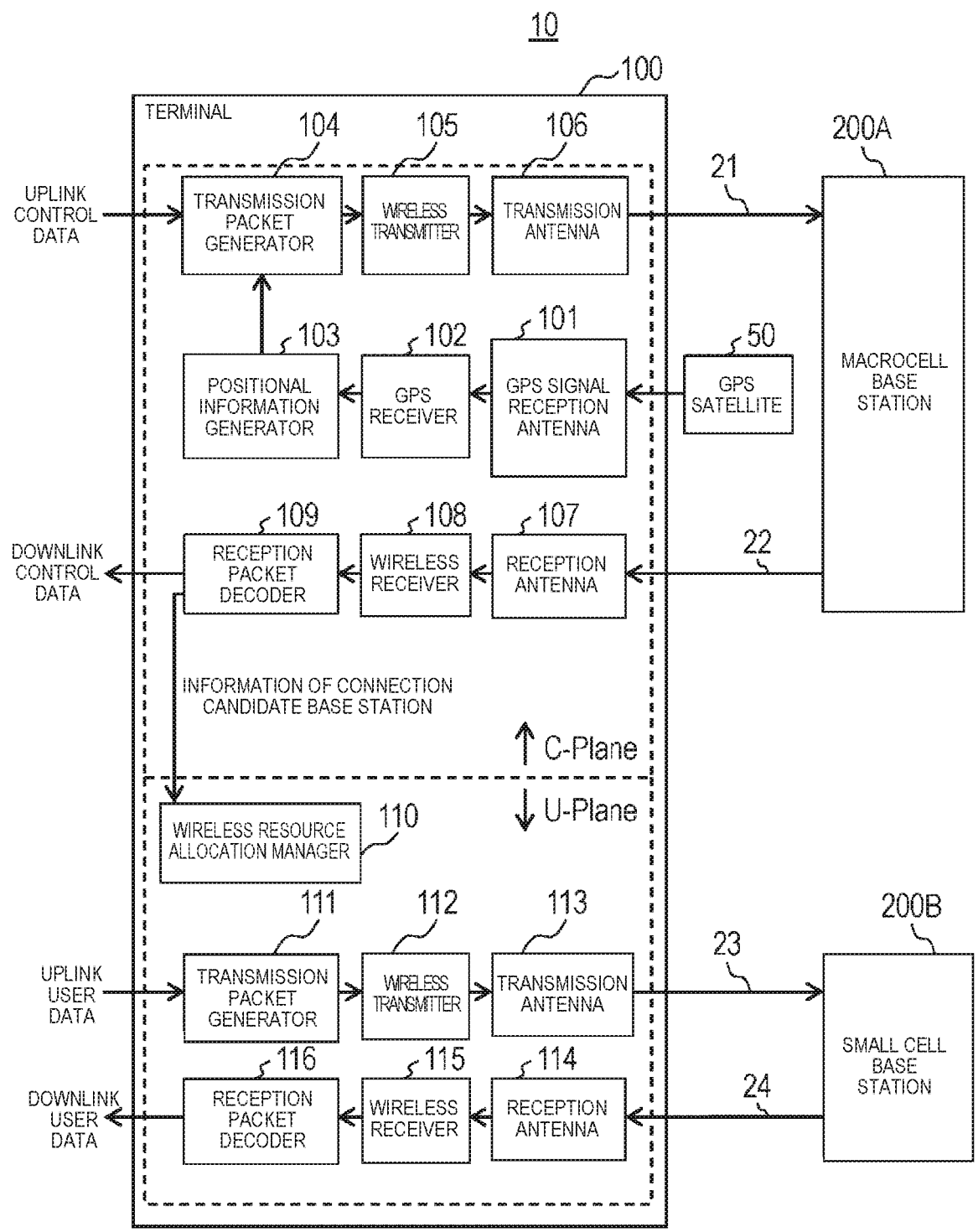
FIG. 2 is a block diagram showing a configuration example of a terminal according to the first exemplary embodiment.

FIG. 2 is a block diagram showing a configuration example of terminal 100. Terminal 100 includes a configuration section for the C-plane and a configuration section for the U-plane.

As the configuration section for the C-plane, terminal 100 includes global positioning system (GPS) signal reception antenna 101, GPS receiver 102, positional information generator 103, transmission packet generator 104, wireless transmitter 105, transmission antenna 106, reception antenna 107, wireless receiver 108, and reception packet decoder 109.

As the configuration section for the U-plane, terminal 100 includes wireless resource allocation manager 110, transmission packet generator 111, wireless transmitter 112, transmission antenna 113, reception antenna 114, wireless receiver 115, and reception packet decoder 116.

GPS receiver 102 receives positional information (for example, information of latitude, longitude, and altitude) of terminal 100 from GPS satellite 50 through GPS signal reception antenna 101. GPS receiver 102 is an example of a second detector.

Positional information generator 103 generates positional information of terminal 100 based on the positional information from GPS satellite 50.

Transmission packet generator 104 generates a packet (first transmission packet) transmitted to macrocell base station 200A. For example, the first transmission packet includes the positional information from positional information generator 103, that is, the positional information of terminal 100, information of the RAT that can be employed or is employed by terminal 100, and various control data items of an uplink 21. For example, the control data items of uplink 21 are acquired from an internal storage (not shown) of terminal 100, an external device (not shown) such as a storage device, and a processor (not shown) of various pieces of software. Uplink 21 is a wireless link to macrocell base station 200A from terminal 100. The wireless link includes various public links, portable telephone links, and wide area wireless links.

Wireless transmitter 105 transmits first transmission packets to macrocell base station 200A through uplink 21 and transmission antenna 106.

Wireless receiver 108 receives a packet (first reception packet) from macrocell base station 200A through downlink 22 and reception antenna 107. Downlink 22 is a wireless link to terminal 100 from macrocell base station 200A.

Reception packet decoder 109 decodes the first reception packet, and acquires first decoded data. For example, the first decoded data includes various control data items of downlink 22 and information of small cell base station 200B (hereinafter, referred to as "connection base station") which is a target candidate to which terminal 100 is connected. For example, the control data items of downlink 22 are delivered to an internal storage (not shown) of terminal 100, an external device (not shown) such as a storage device, and a processor (not shown) of various pieces of software. The information of the connection base station is sent to the configuration section for the U-plane.

Reception packet decoder 109 detects macrocell base station 200A by detecting a synchronization channel from macrocell base station 200A. For example, patterns of synchronization channels transmitted from neighboring macrocell base stations 200A are different such that the macrocell base stations are able to be identified.

Wireless resource allocation manager 110 acquires the information of the connection base station acquired from the configuration section for the C-plane, and manages a wireless resource allocated to the communication (U-plane) of the user data. For example, the wireless resource includes a radio frequency to be used in the communication and a resource block (RB) in the radio frequency. For example, the RB refers to a unit of radio frequency allocation divided according to a frequency axis and a time axis (for example, time slot) of the radio frequency (for example, subcarrier frequency).

That is, wireless resource allocation manager 110 has a function of radio resource control (RRC) and scheduling for managing a wireless resource to be used by each user packet of the U-plane.

Wireless resource allocation manager 110 designates small cell base station 200B as a connection destination among the connection base stations in communication using uplink 23, and allocates an unallocated wireless resource. For example, the wireless resource is allocated according to the information of the RAT included in the information of the connection base station.

Wireless resource allocation manager 110 designates small cell base station 200B as a connection destination among the connection base stations in communication using downlink 24, and allocates an unallocated wireless resource. For example, the wireless resource is allocated according to the information of the RAT included in the information of the connection base station.

Transmission packet generator 111 generates a packet (second transmission packet) transmitted to small cell base station 200B. The second transmission packet includes, for example, user data of uplink 23. For example, the user data items of uplink 23 are acquired from an internal storage (not shown) of terminal 100, an external device (not shown) such as a storage device, and a processor (not shown) of various pieces of software. Uplink 23 is a wireless link to small cell base station 200B from terminal 100. Accordingly, for example, it is possible to report various videos or perform TV (television) conference by using terminal 100.

Wireless transmitter 112 transmits the second transmission packet to the connection base station designated from wireless resource allocation manager 110 through uplink 23 and transmission antenna 113 by using the allocated wireless resource.

Wireless receiver 115 receives a packet (second reception packet) from the connection base station through downlink 24 and reception antenna 114 by using the wireless resource allocated by wireless resource allocation manager 110. Downlink 24 is a wireless link to terminal 100 from small cell base station 200B.

Reception packet decoder 116 decodes the second reception packet, and acquires second decoded data. For example, the second decoded data include various user data items of downlink 24. For example, the user data items of downlink 24 are delivered to an internal storage (not shown) of terminal 100, an external device (not shown) such as a storage device or a display device, and a processor (not shown) of various pieces of software. Accordingly, for example, it is possible to report various videos or perform TV (television) conference by using terminal 100.

Figure 3:
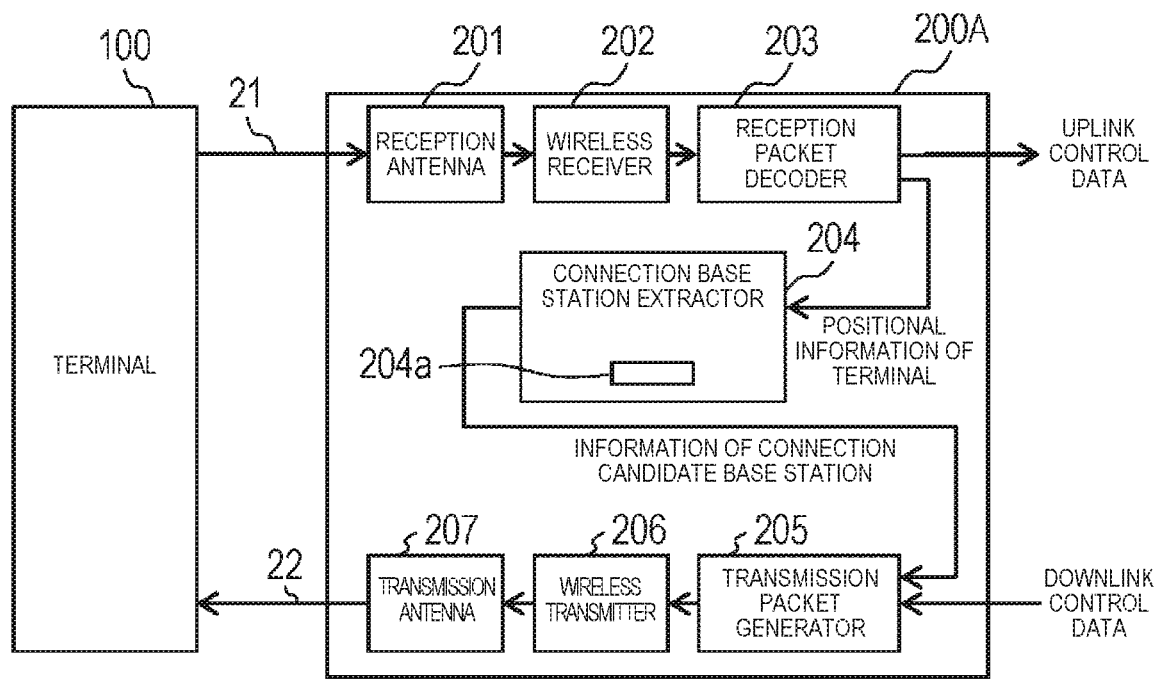
FIG. 3 is a block diagram showing a configuration example of a macrocell base station according to the first exemplary embodiment.

FIG. 3 is a block diagram showing a configuration example of macrocell base station 200A. A basic function as base station 200 applied to macrocell base station 200A will not be described, but is the same as a basic function as base station 200 applied to small cell base station 200B.

Macrocell base station 200A includes reception antenna 201, wireless receiver 202, reception packet decoder 203, connection base station extractor 204, transmission packet generator 205, wireless transmitter 206, and transmission antenna 207.

Wireless receiver 202 receives a packet (third reception packet) from terminal 100 through uplink 21 and reception antenna 201. Wireless receiver 202 is an example of a receiver.

Reception packet decoder 203 decodes the third reception packet, and acquires third decoded data. For example, the third decoded data includes various control data items of uplink 21, positional information of terminal 100, and information of the RAT of terminal 100. For example, the control data items of uplink 21 are delivered to an internal storage (not shown) of macrocell base station 200A, a processor (not shown) of various pieces of software, and a control signal processing device (not shown) within a core network positioned in a higher layer of macrocell base station 200A.

Connection base station extractor 204 refers to small cell information database 204a, and extracts (for example, calculates) the connection base station as a candidate connected to terminal 100. Connection base station extractor 204 is an example of an extractor.

Figure 5:
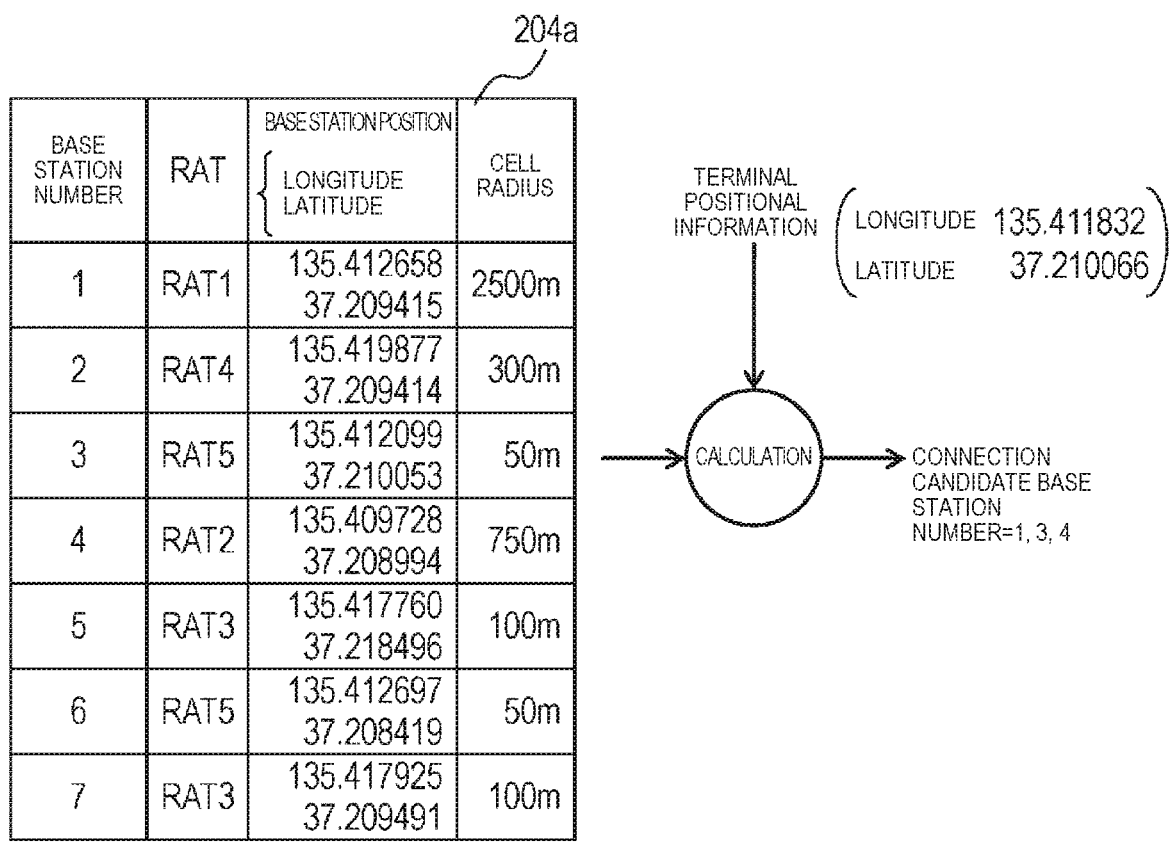
FIG. 5 is a schematic diagram showing an extraction example of a connection base station according to the first exemplary embodiment.

For example, small cell information database 204a retains the information of the RAT capable of being employed by each small cell base station 200B included in wireless communication system 10 (see FIG. 5). For example, small cell information database 204a includes identification information (for example, identification number) of small cell base station 200B, identification information (for example, identification number) of the RAT employed by small cell base station 200B, and specific information of the RAT. For example, small cell information database 204a includes positional information (for example, information of latitude and longitude) of small cell base station 200B and information of the cell radius of small cell base station 200B.

The information of the cell radius may be a specified value retained in small cell base station 200B or may be base station coverage area information based on an actual measurement value of a range in which small cell base station 200B can communicate. If the actual measurement value of the communication available range is used, an actual communication environment in which small cell base station 200B is provided may be further reflected.

For example, the specific information of the RAT includes the following RAT1 to RAT5. For example, RAT1 is an LTE of which a radio frequency band is 700 MHz to 3 GHz. For example, RAT2 is an LTE-Advanced of which a radio frequency band is 15 GHz. For example, RAT3 is wireless LAN communication of which a radio frequency band is 5 GHz. For example, RAT4 is a wireless communication method of which a radio frequency band is 28 GHz. For example, RAT5 is a wireless communication method (for example, millimeter wave communication) of which a radio frequency band is 60 GHz.

For example, connection base station extractor 204 extracts the connection base station based on the information retained in small cell information database 204a, the positional information of terminal 100 from reception packet decoder 203, and the information of the RAT.

FIG. 5 is a schematic diagram showing an extraction example of the connection base station. For example, connection base station extractor 204 calculates distances between small cell base stations 200B and terminal 100 from the positional information items of small cell base stations 200B and the positional information of terminal 100.

Connection base station extractor 204 determines, as the connection base station, small cell base stations 200B capable of employing the RAT matching the RAT capable of being employed by terminal 100 from small cell base stations 200B of which the calculated distance is equal to or less than the cell radius.

In FIG. 5, an example in which three small cell base stations 200B having base station numbers 1, 3, and 4 are extracted as the connection base stations is illustrated.

Transmission packet generator 205 generates a packet (third transmission packet) transmitted to terminal 100. For example, the third transmission packet includes various control data items of downlink 22 and information of the connection base station. For example, the control data items of downlink 22 are acquired from an internal storage (not shown) of macrocell base station 200A, an external device (not shown) such as a storage device, a processor (not shown) of various pieces of software, and a control signal processing device (not shown) within a core network positioned in a higher layer of macrocell base station 200A.

For example, the information of the connection base station includes information indicating which wireless communication standard is used between the connection base station and terminal 100 or information regarding a frequency band. Terminal 100 can ascertain the information of the connection base station by using the C-plane, and thus, it is not necessary for the terminal to perform a base station detection process (base station discovery process) for ascertaining the presence of neighboring base stations having a plurality of types of wireless standards.

Wireless transmitter 206 transmits the third transmission packet to terminal 100 through downlink 22 and transmission antenna 207. Wireless transmitter 206 is an example of a transmitter.

Figure 4:
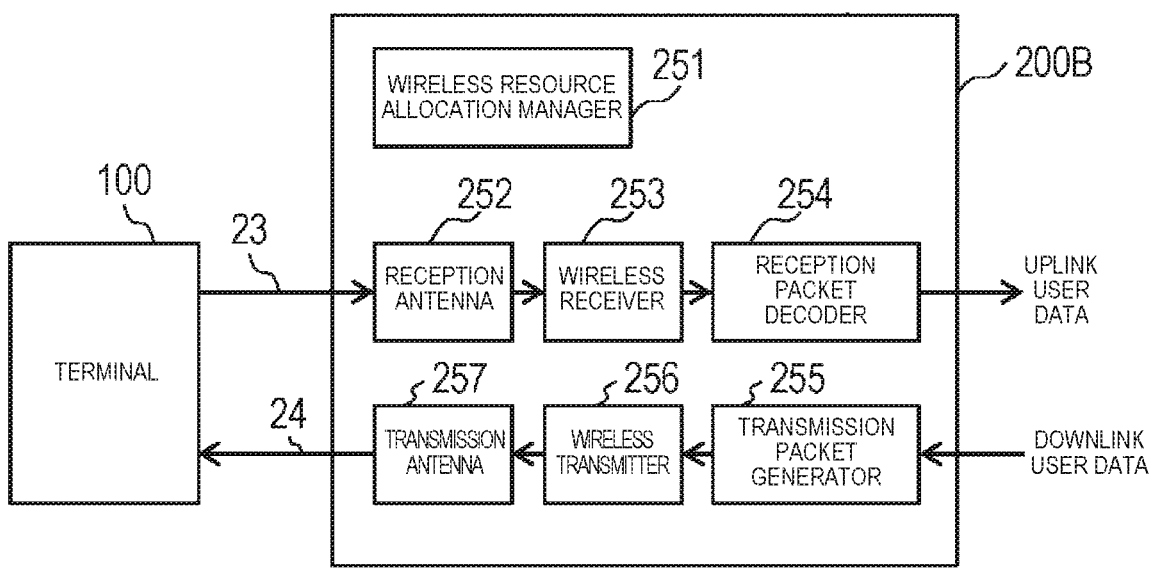
FIG. 4 is a block diagram showing a configuration example of a small cell base station according to the first exemplary embodiment.

FIG. 4 is a block diagram showing a configuration example of small cell base station 200B. A basic function as base station 200 applied to small cell base station 200B will not be described, but is the same as a basic function as base station 200 applied to macrocell base station 200A.

Small cell base station 200B includes wireless resource allocation manager 251, reception antenna 252, wireless receiver 253, reception packet decoder 254, transmission packet generator 255, wireless transmitter 256, and transmission antenna 257.

Wireless resource allocation manager 251 manages the wireless resource allocated to the communication (U-plane) of the user data with terminal 100. That is, wireless resource allocation manager 251 has a function of RRC and scheduling for managing a wireless resource to be used by each user packet of the U-plane.

Wireless resource allocation manager 251 allocates an unallocated wireless resource in the communication using uplink 23. For example, the wireless resource is allocated according to the information of the RAT capable of being employed by small cell base station 200B.

Wireless resource allocation manager 251 allocates an unallocated wireless resource in the communication using downlink 24. For example, the wireless resource is allocated according to the information of the RAT capable of being employed by small cell base station 200B.

Wireless receiver 253 receives a packet (fourth reception packet) from terminal 100 through uplink 23 and reception antenna 252 by using the wireless resource allocated by wireless resource allocation manager 251.

Reception packet decoder 254 decodes the fourth reception packet, and acquires fourth decoded data. For example, the fourth decoded data includes various user data items of uplink 23. For example, the user data items of uplink 23 are delivered to an internal storage (not shown) of small cell base station 200B, an external device (not shown) such as a storage device, a processor (not shown) of various pieces of software, an external server (not shown), and a user data signal processing device (not shown) within a core network positioned in a higher layer of small cell base station 200B.

Transmission packet generator 255 generates a packet (fourth transmission packet) transmitted to terminal 100. For example, the fourth transmission packet includes various user data items of downlink 24. For example, the user data items of downlink 24 are acquired from an internal storage (not shown) of small cell base station 200B, an external device (not shown) such as a storage device, a processor (not shown) of various pieces of software, an external server (not shown), and a user data signal processing device (not shown) within a core network positioned in a higher layer of small cell base station 200B.

Wireless transmitter 256 transmits the fourth transmission packet to terminal 100 through downlink 24 and transmission antenna 257 by using the wireless resource allocated by wireless resource allocation manager 251.

Hereinafter, an operation example of wireless communication system 10 will be described.

Figure 6:
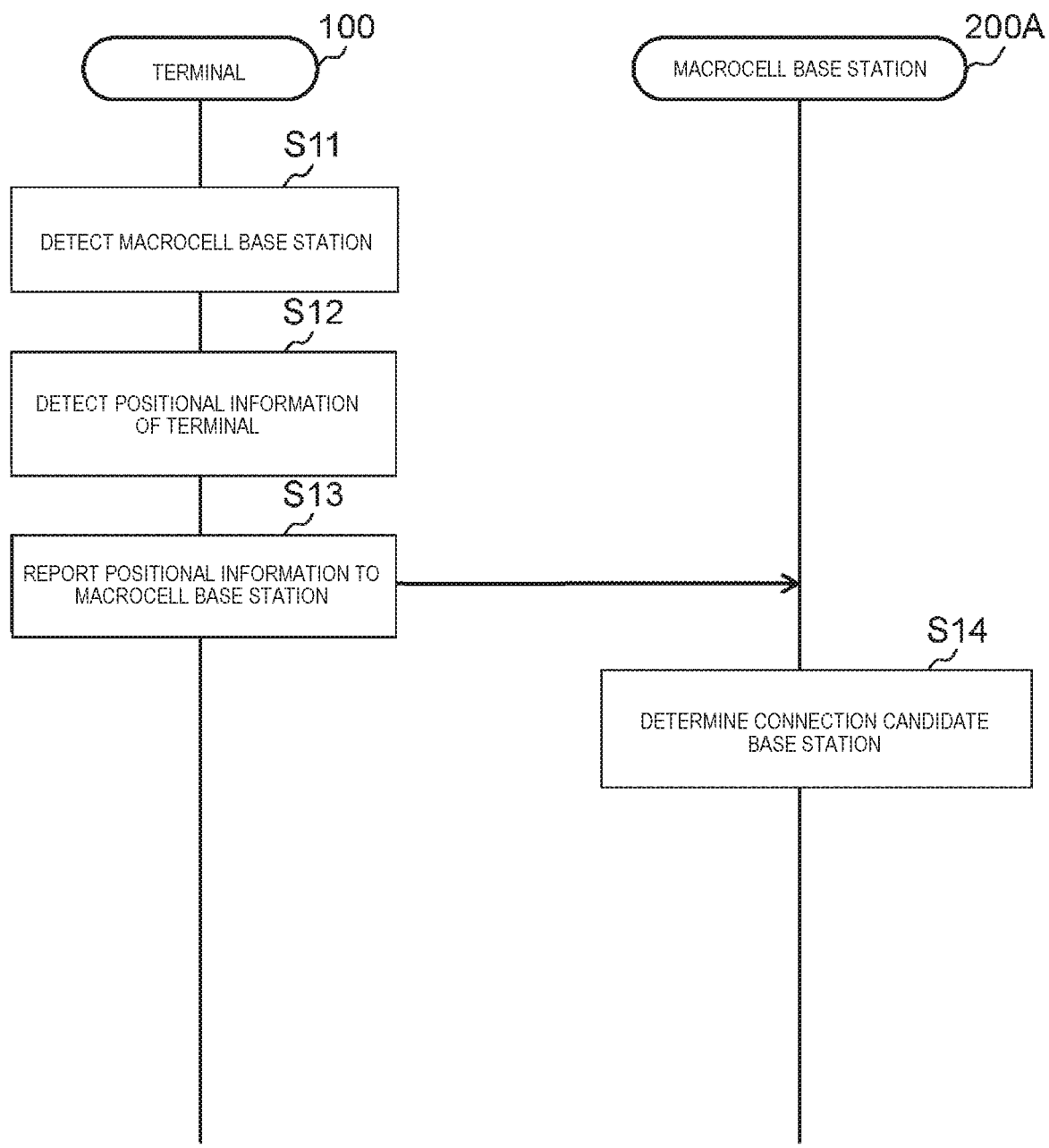
FIG. 6 is a sequence diagram showing an operation example of the wireless communication system according to the first exemplary embodiment.

FIG. 6 is a sequence diagram showing an operation example of wireless communication system 10.

Initially, reception packet decoder 109 determines a base station identification pattern of a synchronization channel (one of control channels of downlink 22) of macrocell base station 200A, and thus, terminal 100 detects macrocell base station 200A to which the terminal belongs (S11). For example, the base station identification pattern of the synchronization channel from macrocell base station 200A far away from terminal 100 is not able to be determined since a reception level of this synchronization channel is low. Accordingly, terminal 100 can detect macrocell base station 200A near (for example, closest to) terminal 100. Reception packet decoder 109 is an example of a first detector.

For example, GPS receiver 102 detects (acquires) the positional information of terminal 100 from GPS satellite 50 (S12). Transmission packet generator 104 generates the packet (first transmission packet) including the detected positional information of terminal 100 and the information of the RAT capable of being employed by terminal 100. Wireless transmitter 105 transmits the packet to macrocell base station 200A (S13).

In macrocell base station 200A, wireless receiver 202 receives the packet (third reception packet) from terminal 100, and reception packet decoder 203 decodes the packet. Thus, the positional information of terminal 100 and the information of the RAT capable of being employed by terminal 100 are acquired.

Connection base station extractor 204 determines the connection base station capable of communicating with terminal 100 among small cell base stations 200B subordinate to macrocell base station 200A (S14). In this case, for example, connection base station extractor 204 refers to small cell information database 204a, and determines the connection base station based on the acquired positional information of terminal 100 and the information of the wireless communication method capable of being employed by terminal 100.

For example, small cell base stations 200B subordinate to macrocell base station 200A mean small cell base stations 200B of which information is registered in small cell information database 204a.

Wireless transmitter 206 adds the information of the determined connection base station to the third transmission packet, and transmits the third transmission packet to terminal 100.

As stated above, terminal 100 may search for macrocell base station 200A. Thus, it is not necessary to sequentially scan the wireless communication methods (RATs) capable of being employed by terminal 100 and to search for (to perform cell search or to discover) small cell base stations 200B positioned near terminal 100 or other base stations 200.

That is, in wireless communication system 10, macrocell base station 200A performs a candidate selection operation of small cell base station 200B as the connection destination on which cell search is to be performed by terminal 100 according to the wireless communication method capable of being employed by terminal 100 and the positional information of terminal 100. Accordingly, it is not necessary for terminal 100 to perform cell search as many as the number (for example, which is equivalent to the number of RATs retained in small cell information database 204a) of RATs present in the heterogeneous network. Thus, a processing load and a processing time for searching for small cell base station 200B as the connection destination can be reduced in terminal 100.

Macrocell base station 200A may have a function of the C-plane and a function of the U-plane. Accordingly, for example, in a case where terminal 100 frequently moves, it is possible to prevent small cell base station 200B connected to terminal 100 from being frequently switched, that is, it is possible to prevent handover from frequently occurring. In a case where the data amount of the user data is equal to or less than a predetermined data amount, terminal 100 may be connected to macrocell base station 200A.

A device which is a higher layer of macrocell base station 200A may function as macrocell base station 200A according to the present exemplary embodiment.

Terminal 100 may deliver control data items regarding the type (for example, wireless standard employed by terminal 100) of terminal 100 or communication content (for example, whether or not it is necessary to perform high-speed transmission) to macrocell base station 200A by using the C-plane. Macrocell base station 200A may determine the connection base station based on the control data items.

Macrocell base station 200A may detect the type (for example, whether the user data is image data or voice data) required by terminal 100 or a movement speed of terminal 100, and may extract the connection base station. Accordingly, for example, eve in a case where terminal 100 frequently moves, it is possible to reduce the number of times the handover of small cell base station 200B occurs.

As mentioned above, wireless communication system 10 includes terminal 100, macrocell base station 200A capable of communicating the control data with terminal 100, and a plurality of small cell base stations 200B capable of communicating the user data with terminal 100.

Terminal 100 includes GPS receiver 102 that detects the positional information of terminal 100, and a communicator. The communicator transmits the positional information of terminal 100 and the information of the RAT capable of being employed by terminal 100, receives the information of the connection base station, and communicates the user data with the connection base station. The communicator receives the synchronization channel transmitted from the macrocell base station, and detects macrocell base station 200A to which terminal 100 belongs. For example, the communicator is wireless transmitter 105, wireless receiver 108, wireless transmitter 112, wireless receiver 115, and reception packet decoder 109.

Macrocell base station 200A communicates the control data with terminal 100. Macrocell base station 200A exclusively has a function of determining which small cell base station 200B is to be connected to terminal 100. Macrocell base station 200A includes wireless receiver 202, connection base station extractor 204, and wireless transmitter 206. Wireless receiver 202 receives the positional information of terminal 100 and the information of the RAT capable of being employed by terminal 100. Connection base station extractor 204 extracts the connection base station from the plurality of small cell base stations 200B based on predetermined information. Wireless transmitter 206 transmits the information of the connection base station to terminal 100. The predetermined information includes the positional information of terminal 100, the information of the RAT capable of being employed by terminal 100, the information of the range in which small cell base station 200B can communicate, and the information of the RAT capable of being employed by small cell base station 200B.

Small cell base station 200B as the connection base station communicates the user data with terminal 100.

Accordingly, wireless communication system 10 and macrocell base station 200A can efficiently select small cell base station 200B as a communication destination of the user data of each terminal 100 in the heterogeneous network having characteristics of different base stations 200 or different wireless communication methods. Thus, wireless communication system 10 and macrocell base station 200A can reduce complicatedness required in the selection of small cell base station 200B. Accordingly, wireless communication system 10 and macrocell base station 200A can reduce the power consumption of terminal 100 when small cell base station 200B connected to terminal 100 is searched for.

Second Exemplary Embodiment

In a second exemplary embodiment, the macrocell base station determines a radio frequency to be used in the communication of the user data between the terminal and the small cell base station. In the present exemplary embodiment, it may be assumed that the extraction of the connection base station in the first exemplary embodiment is completed.

Wireless communication system 10B according to the present exemplary embodiment includes terminal 100B, macrocell base station 200A2, and small cell base station 200B2. In wireless communication system 10B according to the present exemplary embodiment, an arrangement example of the devices (terminal 100B, macrocell base station 200A2, and small cell base station 200B2) is the same as that in FIG. 1, and the illustration and description thereof will be omitted.

Figure 7:
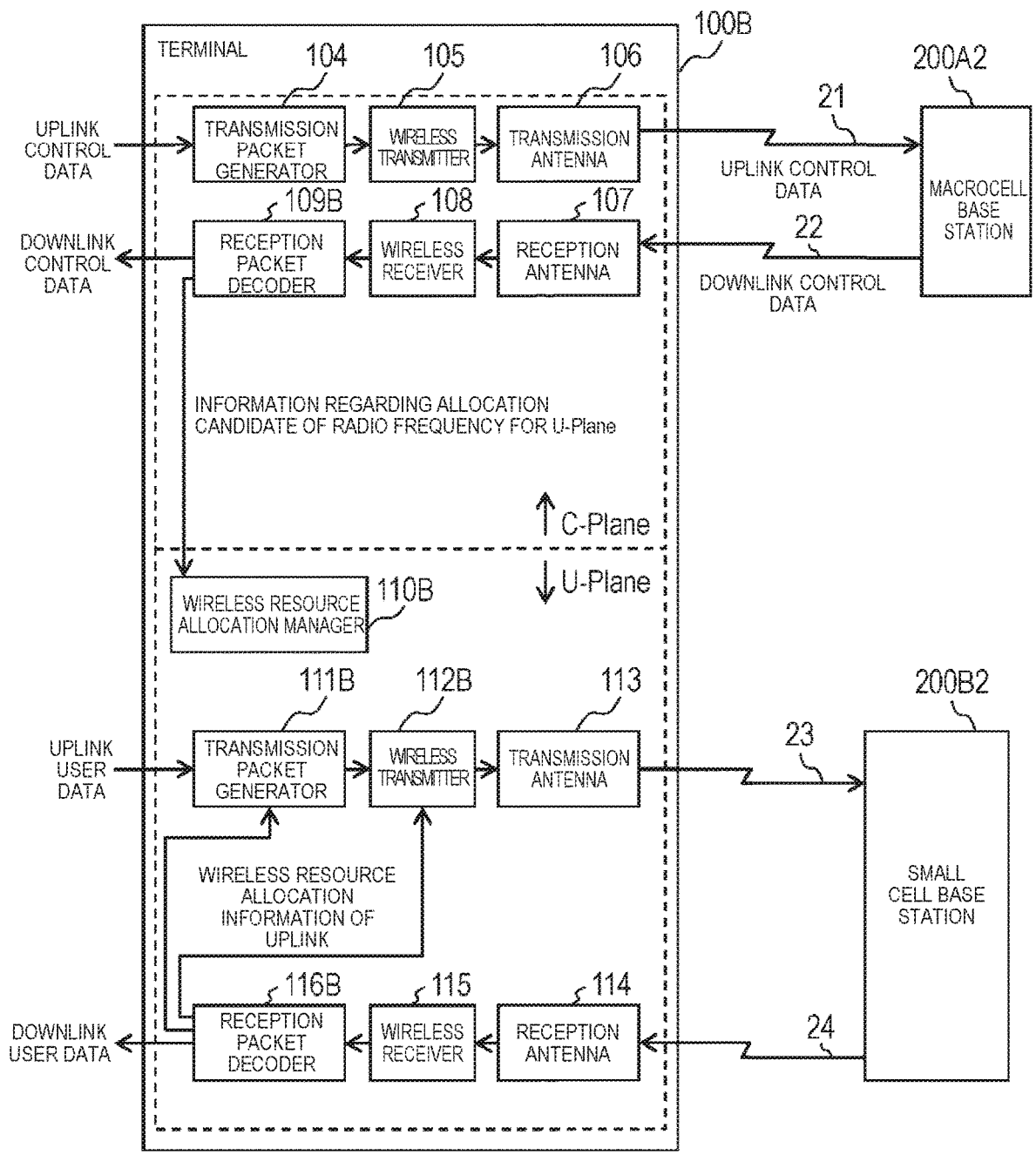
FIG. 7 is a block diagram showing a configuration example of a terminal according to a second exemplary embodiment.

FIG. 7 is a block diagram showing a configuration example of terminal 100B. Terminal 100B includes a configuration section for the C-plane and a configuration section for the U-plane. In terminal 100B of FIG. 7, the same components as the components of terminal 100 shown in FIG. 2 will be assigned the same reference numerals, and the description thereof will be omitted or simplified.

Terminal 100B includes transmission packet generator 104, wireless transmitter 105, transmission antenna 106, reception antenna 107, wireless receiver 108, reception packet decoder 109B, wireless resource allocation manager 110B, transmission packet generator 111B, wireless transmitter 112B, transmission antenna 113, reception antenna 114, wireless receiver 115, and reception packet decoder 116B.

Reception packet decoder 109B decodes the first reception packet, and acquires the first decoded data. For example, the first decoded data includes various control data items of downlink 22, information of the connection base station as small cell base station 200B2 connected to terminal 100B, information of an allocation candidate of the radio frequency in uplink 23, and information of an allocation candidate of the radio frequency in downlink 24. The information of the connection base station is sent to the configuration section for the U-plane.

Wireless resource allocation manager 110B acquires the information of the allocation candidate of the radio frequency and the information of the connection base station acquired from the configuration section for the C-plane. Wireless resource allocation manager 110B acquires the allocation information of the wireless resource of uplink 23 from small cell base station 200B2 from, for example, reception packet decoder 116B.

Wireless resource allocation manager 110B manages the wireless resource allocated to the communication (U-plane) of the user data based on the acquired information. For example, wireless resource allocation manager 110B allocates the radio frequency to be used in the notification of uplink 23 and the RB in the radio frequency based on the information of the allocation candidate of the radio frequency and the allocation information of the wireless resource of uplink 23. For example, wireless resource allocation manager 110B allocates the radio frequency to be used in the communication of downlink 24 and the RB in the radio frequency based on the information of the allocation candidate of the radio frequency.

Reception packet decoder 116B decodes the second reception packet received by wireless receiver 115, and acquires the second decoded data. For example, the second decoded data includes various user data items of downlink 24 and wireless resource allocation information of uplink 23. For example, the wireless resource allocation information of uplink 23 includes information of the wireless resource in the radio frequency allocated by small cell base station 200B2.

Reception packet decoder 116B transmits the wireless resource allocation information of uplink 23 to transmission packet generator 111B and wireless transmitter 112B through wireless resource allocation manager 110B.

Transmission packet generator 111B generates the packet (second transmission packet) transmitted to small cell base station 200B2 based on the wireless resource allocation information of uplink 23.

Wireless transmitter 112B transmits the second transmission packet to small cell base station 200B2 as the connection base station designated from wireless resource allocation manager 110B through uplink 23 and transmission antenna 113 by using the allocated wireless resource based on the wireless resource allocation information of uplink 23.

Figure 8:
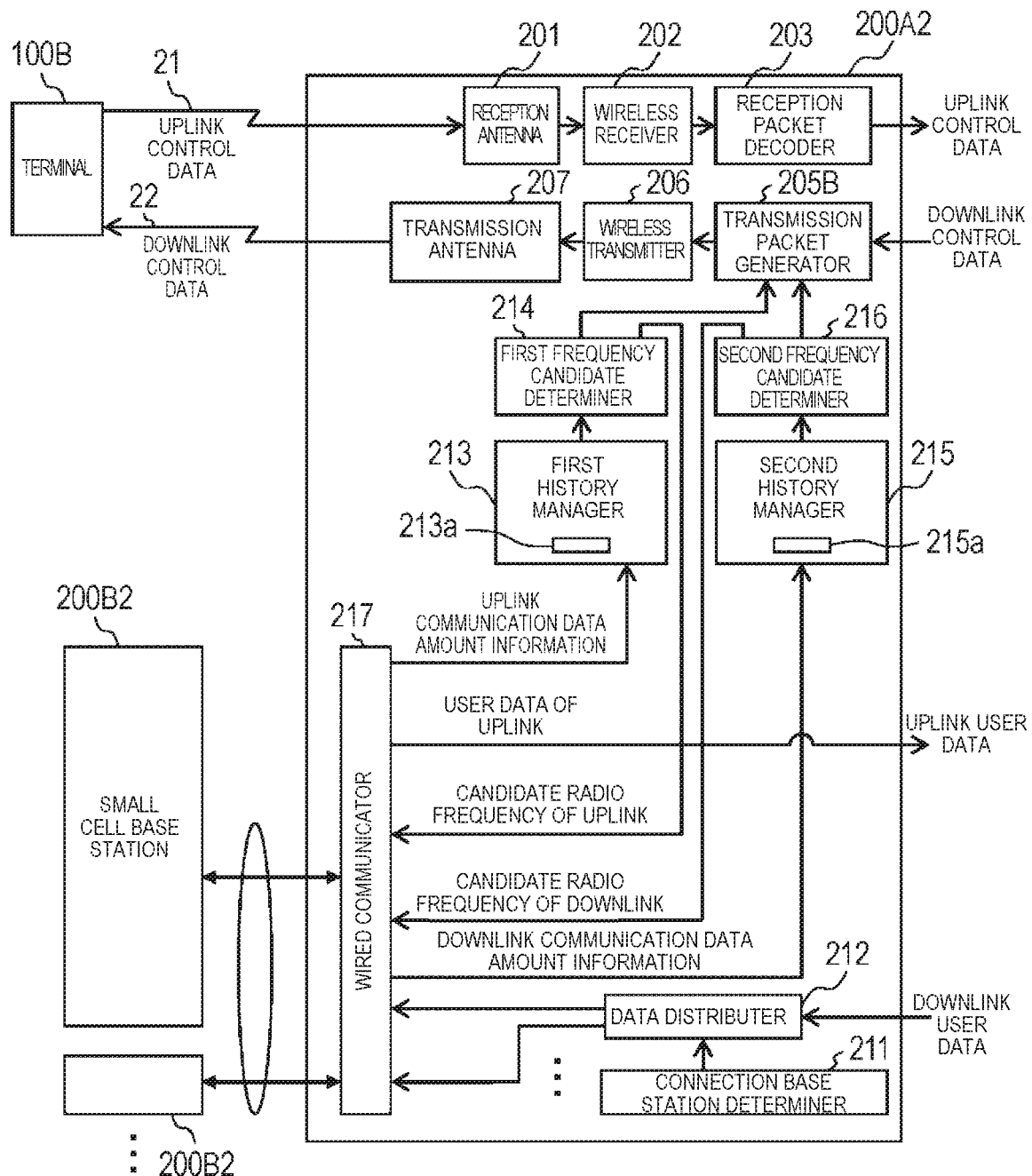
FIG. 8 is a block diagram showing a configuration example of a macrocell base station according to the second exemplary embodiment.

FIG. 8 is a block diagram showing a configuration example of macrocell base station 200A2. In macrocell base station 200A2 of FIG. 8, the same components as the components of macrocell base station 200A shown in FIG. 3 will be assigned the same reference numerals, and the description thereof will be omitted and simplified.

Macrocell base station 200A2 includes reception antenna 201, wireless receiver 202, reception packet decoder 203, transmission packet generator 205B, wireless transmitter 206, and transmission antenna 207. Macrocell base station 200A2 includes connection base station determiner 211, data distributer 212, first history manager 213, first frequency candidate determiner 214, second history manager 215, second frequency candidate determiner 216, and wired communicator 217.

Connection base station determiner 211 determines small cell base station 200B2 that communicates the user data with terminal 100B. For example, connection base station determiner 211 has the same function of connection base station extractor 204, and extracts the connection base station. Accordingly, connection base station determiner 211 may retain small cell information database 204a described above. Connection base station determiner 211 may extract the connection base station by a known method different from the extraction method of the connection base station described in the first exemplary embodiment.

Connection base station determiner 211 may extract a plurality of connection base stations. In a case where one connection base station is extracted, connection base station determiner 211 selects small cell base station 200B2 as the connection base station to be connected to terminal 100B.

In a case where a plurality of connection base stations is extracted, connection base station determiner 211 selects one of the plurality of connection base stations. For example, it is assumed that small cell base station 200B2 that performs RAT1 to RAT3 is the connection base station and a communication speed of RAT3 is known to be highest among the communication speeds of RAT1 to RAT3. In this case, connection base station determiner 211 may select small cell base station 200B2 that employs RAT3, as the connection base station.

For example, connection base station determiner 211 refers to small cell information database 204a, and extracts the RAT capable of being employed by the selected connection base station. Connection base station determiner 211 is an example of a first extractor.

Data distributer 212 distributes the user data items of downlink 24 to small cell base stations 200B2 which are the transmission destinations of the user data items. For example, the user data items of downlink 24 are acquired from a user data signal processing device (not shown) within a core network positioned in a higher layer of the base station.

Data distributer 212 acquires the information of the transmission destination of the user data from a header of the packet including the user data. For example, terminal 100B subordinate to small cell base station 200B2 is described in the information of the transmission destination. Data distributer 212 transmits the user data to small cell base station 200B2 as the connection base station that performs the connection of the U-plane with terminal 100B.

First history manager 213 includes a utilization history database 213a that retains information of a past utilization result of the radio frequency in uplink 23. For example, information of a communication data amount communicated in the past is accumulated for each radio frequency in utilization history database 213a. For example, utilization history database 213a is prepared for each small cell base station 200B2. This accumulation may be accumulation performed for a predetermined period, or the accumulation may be continuously performed irrespective of a period.

First history manager 213 acquires utilization result information of uplink 23 from wired communicator 217. For example, the utilization result information includes information of the radio frequency used in the communication between terminal 100B and the connection base station and information of the communication data amount communicated using the radio frequency. For example, first history manager 213 adds the communication data amount included in the acquired utilization result information to the radio frequency of utilization history database 213a matching the radio frequency included in the acquired utilization result information, and updates the information retained in utilization history database 213a.

First frequency candidate determiner 214 refers to utilization history database 213a, and determines the radio frequency of which the utilization result is great (large), as a candidate of the radio frequency allocated to the communication in uplink 23. For example, the radio frequency of which the utilization result is large may be a radio frequency in which the communication data amount accumulated in utilization history database 213a is largest, or may be a radio frequency in which the communication data amount is not largest and is equal to or greater than a predetermined amount. A plurality of candidates from candidates having high priority to candidates having a low priority may be included as the candidates of the radio frequency. First frequency candidate determiner 214 is an example of a second extractor.

Accordingly, since the accumulated data amount becomes large in the radio frequency frequently used in the past, there is a high possibility that this radio frequency will be selected as the candidate. There is a high possibility that the communication between the connection base station and terminal 100B will succeed in the radio frequency frequently used in the past, in the future. Accordingly, macrocell base station 200A2 can improve communication accuracy of the communication using uplink 23.

Second history manager 215 includes utilization history database 215a that retains information of a past utilization result of the radio frequency in downlink 24. For example, information of the communication data amount communicated in the past is accumulated for each radio frequency in utilization history database 215a. For example, utilization history database 215a is prepared for each small cell base station 200B2. This accumulation may be accumulation performed for a predetermined period, or the accumulation may be continuously performed irrespective of a period.

Second history manager 215 acquires the utilization result information of downlink 24 from wired communicator 217. For example, second history manager 215 adds the communication data amount included in the acquired utilization result information to the radio frequency of utilization history database 215a matching the radio frequency included in the acquired utilization result information, and updates the information retained in utilization history database 215a.

Second frequency candidate determiner 216 refers to utilization history database 215a, and determines the radio frequency of which the utilization result is great (large), as a candidate of the radio frequency allocated to the communication in downlink 24. For example, the radio frequency of which the utilization result is large may be a radio frequency in which the communication data amount accumulated in utilization history database 215a is largest, or may be a radio frequency in which the communication data amount is not largest and is equal to or greater than a predetermined amount. A plurality of candidates from candidates having high priority to candidates having a low priority may be included as the candidates of the radio frequency. Second frequency candidate determiner 216 is an example of a second extractor.

Accordingly, since the accumulated data amount becomes large in the radio frequency frequently used in the past, there is a high possibility that this radio frequency will be selected as the candidate. There is a high possibility that the communication between the connection base station and terminal 100B will succeed in the radio frequency frequently used in the past, in the future. Accordingly, macrocell base station 200A2 can improve communication accuracy of the communication using downlink 24.

Wired communicator 217 communicates the data with small cell base station 200B2 through a wired link (for example, optical link). For example, the user data of uplink 23, the information of the utilization result of uplink 23, and the information of the utilization result of downlink 24 are included in the data transmitted to macrocell base station 200A2 from small cell base station 200B2. For example, the user data of downlink 24, the information of the allocation candidate of the radio frequency of uplink 23, and the information of the allocation candidate of the radio frequency of downlink 24 are included in the data transmitted from macrocell base station 200A2 to small cell base station 200B2. The information of the allocation candidates of the radio frequency may include information of priorities (for example, which are to be allocated in order of frequencies f7, f1, and f4) of a plurality of allocation candidates. Wired communicator 217 is an example of a receiver.

Macrocell base station 200A2 and small cell base station 200B2 may be connected through a wireless link. That is, the macrocell base station may include a wireless communicator in place of wired communicator 217.

Transmission packet generator 205B generates the packet (third transmission packet) transmitted to terminal 100B. For example, the third transmission packet includes various control data items of downlink 22, the information of the connection base station, the information of the allocation candidate of the radio frequency in uplink 23, and the information of the allocation candidate of the radio frequency in downlink 24. In place of the information of the connection base station, the information of the connection base station as the candidate may be included in the third transmission packet. In this case, for example, terminal 100B that receives the information of the connection base station as the candidate may select the connection base station among the connection base stations as the candidates depending on an allocation state of the wireless resource.

Figure 9:
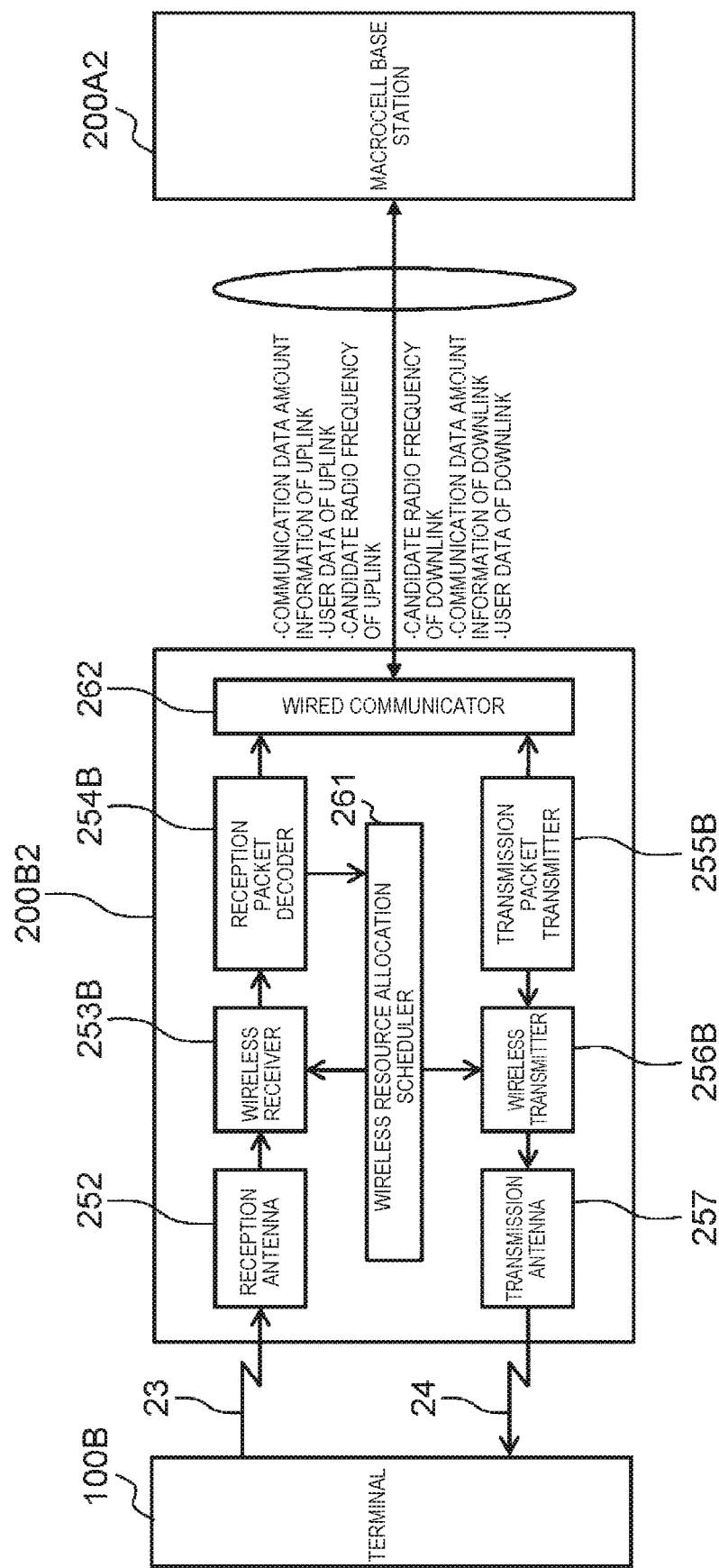
FIG. 9 is a block diagram showing a configuration example of a small cell base station according to the second exemplary embodiment.

FIG. 9 is a block diagram showing a configuration example of small cell base station 200B2. In small cell base station 200B2 of FIG. 9, the same components as the components of small cell base station 200B shown in FIG. 4 will be assigned the same reference numerals, and the description thereof will be omitted or simplified.

Small cell base station 200B2 includes reception antenna 252, wireless receiver 253B, reception packet decoder 254B, transmission packet generator 255B, wireless transmitter 256B, transmission antenna 257, wireless resource allocation scheduler 261, and wired communicator 262.

Wireless receiver 253B receives the packet (fourth reception packet) from terminal 100B through uplink 23 and reception antenna 252 by using the wireless resource allocated by wireless resource allocation scheduler 261. Wireless receiver 253B is an example of a communicator.

Reception packet decoder 254B decodes the fourth reception packet, and acquires the fourth decoded data. Reception packet decoder 254B analyzes the received result by wireless receiver 253B, and acquires the utilization result information of uplink 23. Reception packet decoder 254B transmits the utilization result information of uplink 23 and various user data items of uplink 23 to wired communicator 262.

Transmission packet generator 255B generates the packet (fourth transmission packet) transmitted to terminal 100B. Transmission packet generator 255B analyzes the transmitted result by wireless transmitter 256B, and acquires the utilization result information of downlink 24. Transmission packet generator 255B transmits the utilization result information of downlink 24 to wired communicator 262.

Wireless transmitter 256B transmits the fourth transmission packet to terminal 100B through downlink 24 and transmission antenna 257 by using the wireless resource allocated by wireless resource allocation scheduler 261. Wireless transmitter 256B is an example of a communicator.

Wireless resource allocation scheduler 261 acquires the information of the allocation candidate of the radio frequency in uplink 23 and the information of the allocation candidate of the radio frequency in downlink 24 from wired communicator 262.

For example, wireless resource allocation scheduler 261 searches for an allocation state of the RB in the radio frequency as the allocation candidate based on the information of the allocation candidate of the radio frequency in uplink 23 from macrocell base station 200A2. Similarly, for example, wireless resource allocation scheduler 261 searches for the allocation state of the RB in the radio frequency as the allocation candidate based on the information of the allocation candidate of the radio frequency in downlink 24 from macrocell base station 200A2.

Wireless resource allocation scheduler 261 allocates an unallocated RB to the communication of uplink 23 based on the searched result of the allocation state of the RB of the radio frequency in uplink 23. The wireless resource allocation scheduler allocates an unallocated RB to the communication of downlink 24 based on the searched result of the allocation state of the RB of the radio frequency in downlink 24. Wireless resource allocation scheduler 261 may allocate the RB and may designate adaptive modulation and coding (AMC). The allocation of the RB is one of the functions of the U-plane. Wireless resource allocation scheduler 261 is an example of a determiner.

In a case where there is no unallocated RB in the radio frequency as the allocation candidate, wireless resource allocation scheduler 261 may check an allocation state of a radio frequency (for example, a radio frequency having the next priority) as another candidate, and may try to allocate the RB of this radio frequency.

Wireless resource allocation scheduler 261 may acquire information of allocation candidates of a plurality of radio frequencies from macrocell base station 200A2, may check an allocation state of the RBs in these radio frequencies, and may allocate unallocated RBs.

Wireless resource allocation scheduler 261 sends the wireless resource allocation information allocated to uplink 23 to wireless receiver 253B, and sends the wireless resource allocation information allocated to downlink 24 to wireless transmitter 256B. For example, the wireless resource allocation information includes information of the radio frequency to be used in the communication of the user data and information of the RB allocated in the radio frequency.

Wireless resource allocation scheduler 261 adds the wireless resource allocation information for uplink 23 to the fourth transmission packet such that the wireless resource allocation information for uplink 23 is notified to terminal 100B. Accordingly, terminal 100B can also communicate the user data by using the radio frequency allocated by macrocell base station 200A2 or small cell base station 200B2 and the RB allocated by small cell base station 200B2.

As stated above, wireless resource allocation scheduler 261 determines the RB of the radio frequency to be used in the communication of uplink 23, and thus, small cell base station 200B2 can unitarily manage the allocation of the wireless resource even in a case where there is a plurality of terminals 100B subordinate to the small cell base station. The radio frequency to be used by small cell base station 200B2 is notified from macrocell base station 200A2 based on the past utilization result. There is a high probability that the radio frequency will not be frequently used in a neighboring small cell base station, and thus, the wireless resource can be expected to be comparatively empty. Thus, for example, it can be expected that small cell base station 200B2 can efficiently allocate the wireless resources to the plurality of terminals 100B subordinate to the small cell base station.

Wired communicator 262 communicates data with macrocell base station 200A2 through the wired link (for example, optical link). For example, the user data of uplink 23, the information of the utilization result of uplink 23, and the information of the utilization result of downlink 24 are included in the data transmitted to macrocell base station 200A2 from small cell base station 200B2. For example, the user data of downlink 24, the information of the allocation candidate of the radio frequency of uplink 23, and the information of the allocation candidate of the radio frequency of downlink 24 are included in the data transmitted from macrocell base station 200A2 to small cell base station 200B2. Wired communicator 262 is an example of a receiver and a transmitter.

Macrocell base station 200A2 and small cell base station 200B2 may be connected through a wireless link. That is, the small cell base station may include a wireless communicator in place of wired communicator 262.

Although it has been described that the accumulated value of the communication data amount for each radio frequency is used as the information of the utilization result, information of another utilization result may be used. For example, the information of another utilization result includes a total connection time of terminal 100B and small cell base station 200B2 using the radio frequency and the number of times terminal 100B and small cell base station 200B2 using the radio frequency are connected. For example, as the total connection time is long and as the number of times of connection is large, the higher the priority with which the radio frequency is selected. The communication data amount is an example of a data communication amount, the total connection time is an example of a data communication time, and the number of times of connection is an example of the number of times of data communication.

An example of the allocation method of the wireless resource using the utilization result is described in the following cited patent literature. Utilization history databases 213a and 215a may be distinguishably provided for each time zone when the wireless resource is allocated or for each transmission power of small cell base station 200B2. Utilization history databases 213a and 215a may be distinguishably provided for uplink 23 and downlink 24. Utilization history database 213a and 215a may be distinguishably provided by another known method. Accordingly, the allocation candidate of the radio frequency can be determined depending on the utilization result in consideration of various trends.

(Cited Patent Literature: Japanese Patent Unexamined Publication No. 2013-232815)

As mentioned above, for example, macrocell base station 200A2 preferentially allocates a radio frequency in which an index (for example, communication data amount) is largest to the communication between terminal 100B and small cell base station 200B2 by using the information of the utilization result. Accordingly, macrocell base station 200A2 can segregate the radio frequency as the candidate to be used by each small cell base station 200B2 in an autonomously distributed manner.

Hereinafter, an operation example of wireless communication system 10B will be described.

Figure 10:
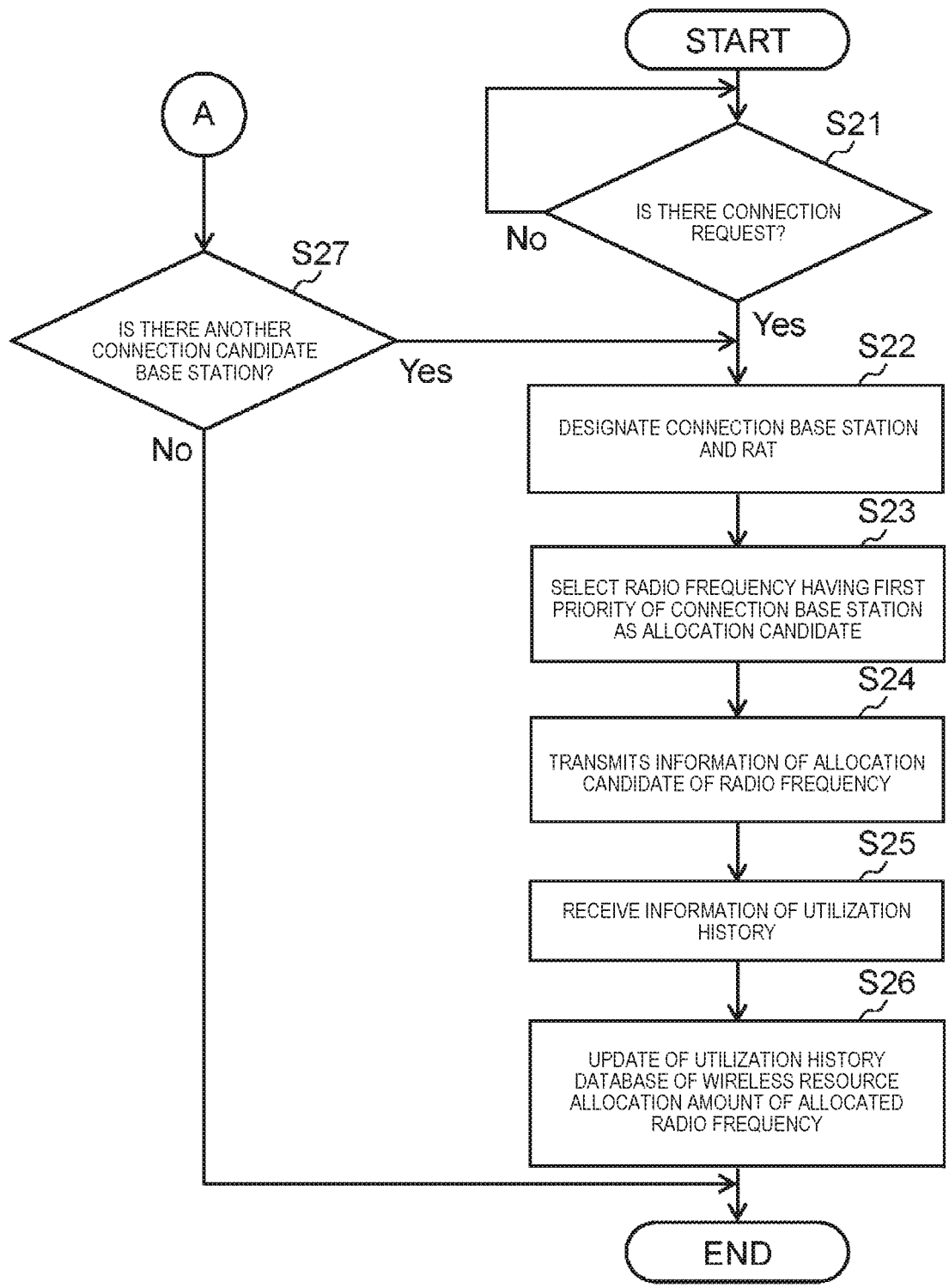
FIG. 10 is a sequence diagram showing an operation example of the macrocell base station of the wireless communication system according to the second exemplary embodiment.
Figure 11:
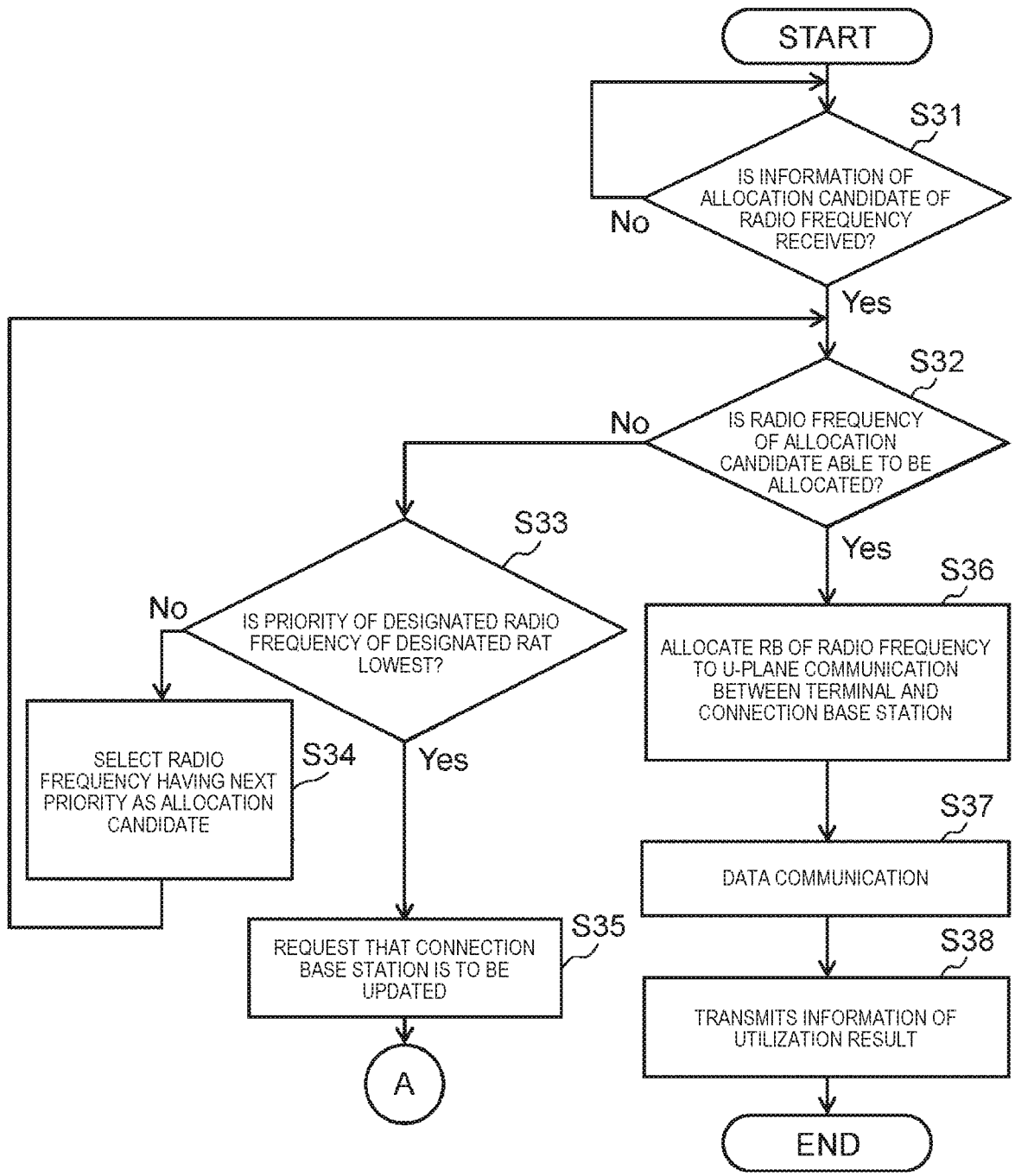
FIG. 11 is a sequence diagram showing an operation example of the small cell base station of the wireless communication system according to the second exemplary embodiment.

FIG. 10 is a sequence diagram showing an operation example of macrocell base station 200A2. FIG. 11 is a sequence diagram showing an operation example of small cell base station 200B2. In FIGS. 10 and 11, it is assumed that the allocation of the radio frequency or the RB, the selection of the allocation candidate, and the communication of the user data are performed in at least one of uplink 23 and downlink 24.

In FIGS. 10 and 11, the operation example of macrocell base station 200A2 and the operation example of small cell base station 200B2 will be separately described. Hereinafter, an operation of macrocell base station 200A2 or small cell base station 200B2 will be mainly described in parallel in a sequence of time.

Initially, in macrocell base station 200A2, wireless receiver 202 or wireless transmitter 206 determines whether or not there is a connection request (S21). For example, the connection request includes a connection request for another device (for example, macrocell base station 200A2 or small cell base station 200B2) from terminal 100B or a connection request for terminal 100B from another device. For example, in a case where a moving image of a content server is acquired and reproduced by terminal 100B, the connection request for another device from terminal 100B is generated. For example, in a case where another terminal calls terminal 100B, the connection request for terminal 100B from another device is generated.

Connection base station determiner 211 designates small cell base station 200B2 as the connection base station to be connected to terminal 100B which requests the connection and the RAT employed by the connection base station (S22).

First frequency candidate determiner 214 refers to utilization history database 213a of the selected connection base station, and selects the radio frequency of which the number of times the radio frequency is used is large, for example, the radio frequency in which the data amount is largest, as the allocation candidate of the radio frequency (S23). Alternatively, second frequency candidate determiner 216 refers to utilization history database 215a of the selected connection base station, and selects the radio frequency of which the number of times the radio frequency is used is large, for example, the radio frequency in which the data amount is largest, as the allocation candidate of the radio frequency (S23).

Wired communicator 217 notifies the connection base station of the information of the allocation candidate of the radio frequency (S24). Wireless transmitter 206 notifies terminal 100B of the information of the allocation candidate of the radio frequency.

Small cell base station 200B2 as the connection base station receives the information of the allocation candidate of the radio frequency from macrocell base station 200A2 (S31). Wireless resource allocation scheduler 261 searches for the allocation state of the RB in the radio frequency based on the information of the allocation candidate of the radio frequency acquired from macrocell base station 200A2, and determines whether or not the RB is able to be allocated (S32).

In a case where it is determined that the RB is not able to be allocated in S32, wireless resource allocation scheduler 261 determines whether or not the priority of the radio frequency selected as the allocation candidate is lowest in the RAT designated in S22 (S33).

For example, in a case where the process of S33 is a first process, the priority of the radio frequency of the allocation candidate is lowest, and the priority of the radio frequency of the allocation candidate is decreased whenever the number of times the process of S33 is performed is increased. Here, it is assumed that the information of the allocation candidate of the radio frequency includes information of priorities of a plurality of radio frequencies.

In a case where the priority of the radio frequency selected as the allocation candidate is not lowest in S33, wireless resource allocation scheduler 261 selects a radio frequency having a priority lower than that of the radio frequency by one level, that is, a radio frequency of the next priority, as the allocation candidate (S34). Small cell base station 200B2 proceeds to the process of S32.

For example, in a case where the priority of the radio frequency selected as the allocation candidate is lowest in S33, wireless resource allocation scheduler 261 notifies macrocell base station 200A2 such that it is determined whether or not there is another connection base station as the candidate to be connected. That is, wired communicator 262 may transmit a change request of the connection base station to macrocell base station 200A2 (S35).

If macrocell base station 200A2 receives the notification of S35 from small cell base station 200B2, connection base station determiner 211 determines whether or not there is another connection base station as the candidate (S27). In a case where it is determined that there is another connection base station as the candidate, the process of S22 is returned.

Meanwhile, in a case where it is determined that there is no connection base station as the candidate in addition to the designated connection base station, wireless resource allocation scheduler 261 of the designated connection base station is not able to allocate the wireless resource for the connection request, and the connection request fails to call or waits for. Wireless communication system 10B ends the process of FIG. 10.

In a case where it is determined that the RB of the radio frequency is able to be allocated in S32, wireless resource allocation scheduler 261 allocates the RB of the radio frequency capable of being allocated (S36). Information of the RB of the allocated radio frequency, that is, the wireless resource allocation information is notified to terminal 100B from the connection base station.

Wireless transmitter 256B or wireless receiver 253B communicates the user data with terminal 100B by using the RB of the allocated radio frequency (S37).

For example, if the user data is communicated, wired communicator 262 transmits the utilization result information including the information of the communication data and the radio frequency used in this communication to macrocell base station 200A2 (S38). After the process of S38, the process of small cell base station 200B2 is ended.

In macrocell base station 200A2, wired communicator 217 receives the utilization result information from the connection base station (S25). First history manager 213 updates utilization history database 213a based on this utilization result information (utilization result information of uplink 23) (S26). Alternatively, second history manager 215 updates utilization history database 215a based on this utilization result information (utilization result information of downlink 24) (S26). After the process of S26, the process of macrocell base station 200A2 is ended.

As mentioned above, macrocell base station 200A2 can allocate the radio frequency having a low possibility of communication interference by using the information of the past utilization result regarding the communication of the user data. For example, in a case where the RB of the radio frequency of the allocation candidate is not able to be allocated in the connection base station, since the allocation of the RB of another radio frequency or the change request of the connection base station is performed, there is a high possibility that terminal 100B will find the radio frequency for communicating the user data. That is, small cell base station 200B2 can assist in allocating the radio frequency selected by macrocell base station 200A2, and thus, it is possible to improve allocation efficiency or utilization efficiency of the wireless resource.

Hereinafter, a communication environment of wireless communication system 10B will be described.

Here, it is assumed that the connection base station is small cell base station 200B2 that employs RAT5. It is assumed that terminal 100B employs RAT5. It is assumed that there are eight available radio frequencies in RAT5. Eight radio frequencies in RAT5 are described as $f_{5,1}$, $f_{5,2}$, $f_{5,3}$, $f_{5,4}$, $f_{5,5}$, $f_{5,6}$, $f_{5,7}$, and $f_{5,8}$. For example, $f_{5,1}$ refers to a first radio frequency of RAT5.

FIG. 12 is a schematic diagram showing an example of the positional relationship between small cell base station 200B2 and terminal 100B. It is assumed that small cell base station 200B2 shown in FIG. 12 is present near terminal 100B and is able to employ RAT5.

In FIG. 12, small cell base stations 200B2 (SBS1 to SBS6) surrounded by solid lines are base stations of a communication operator to which terminal 100B subscribes. Small cell base stations 200B2 (SBS7 to SBS9) surrounded by dotted lines are base stations of a communication operator different from the communication operator to which terminal 100B subscribes.

In FIG. 12, small cell base station 200B2 as the connection base station is SBS4. However, terminal 100B shares eight radio frequencies $f_{5,1}$ to $f_{5,8}$ with SBS1 to SBS9 even in consideration with only small cell base station 200B2 present near this terminal. Accordingly, when terminal 100B communicates with SBS4, since the radio frequency being used by SBS1 to SBS3 and the radio frequency being used by SBS5 to SBS9 which are other base stations overlap each other, there is a possibility that these base stations will interfere in each other and communication quality will be deteriorated.

As a comparative example, in order to enhance the degradation in communication quality, it is assumed that each terminal detects link quality of the wireless link (for example, radio frequency employed by used RAT5) to be used by each terminal and notifies upstream equipment (for example, small cell base station or macrocell base station) of the detected link quality. In this case, it is necessary for the terminal to monitor the link quality for eight radio frequencies $f_{5,1}$, to $f_{5,8}$ of RAT5. The detection result of the link quality needs to be notified to the small cell base station, and needs to be notified to the macrocell base station.

In the comparative example, it is considered that the macrocell base station detects link quality of the wireless link to be used by the small cell base stations of the same communication operator and summarizes the detected link quality. However, it is difficult for the macrocell base station to summarize the detected link quality with information of link quality of wireless links used by small cell base stations of different communication operators. In a case where a plurality of different communication operators is able to allocate the same radio frequency band, a countermeasure for the above-described interference is further needed in the future.

In contrast, in the present exemplary embodiment, macrocell base station 200A2 extracts the allocation candidate of the radio frequency depending on the past utilization result acquired by using each radio frequency, and thus, it is not necessary to recognize which radio frequency is allocated to another small cell base station 200B2. Thus, macrocell base station 200A2 does not need to recognize which communication operator possesses small cell base station 200B2, and can easily allocate a radio frequency having few interference to the connection base station with high accuracy.

As stated above, since macrocell base station 200A2 collectively allocates the radio frequencies to the communication between small cell base stations 200B2 and terminals 100B subordinate to the macrocell base station, terminal 100B does not need to detect link quality information of the radio frequency capable of being used by each RAT. For example, the link quality information includes signal-to-interference-noise ratio (SINR). Accordingly, it is not necessary for terminal 100B to notify small cell base station 200B2 of the link quality information, and it is not necessary for small cell base station 200B2 to notify macrocell base station 200A2 of the link quality information.

That is, it is not necessary for terminal 100B to detect the link quality of the radio frequencies as many as the radio frequencies employed by the RAT present in the heterogeneous network. Thus, terminal 100B can reduce a processing load and a processing time for detecting the link quality of each radio frequency. It is not necessary for the connection base station to frequently deliver the link quality information of each radio frequency between terminal 100B and macrocell base station 200A2, and thus, it is possible to reduce a processing load and a processing time regarding the notification of the link quality of each radio frequency.

Macrocell base station 200A2 unitarily manages the allocation of the radio frequencies between terminal 100B and the connection base station, and thus, terminal 100B can further reduce the interference of the communication with another terminal or another base station than in a case where each terminal determines the radio frequency used by each terminal. Macrocell base station 200A2 unitarily manages the allocation of the radio frequencies, and thus, the connection base station can easily allocate the wireless resource such as the RB in the radio frequency.

As mentioned above, wireless communication system 10B includes terminal 100B, macrocell base station 200A2 capable of communicating the control data with terminal 100B, and a plurality of small cell base stations 200B2 capable of communicating the user data with terminal 100B.

Macrocell base station 200A2 includes connection base station determiner 211, first frequency candidate determiner 214 or second frequency candidate determiner 216, wireless transmitter 206, and wired communicator 217. Connection base station determiner 211 extracts the connection base station from the plurality of small cell base stations 200B2. First frequency candidate determiner 214 or second frequency candidate determiner 216 extracts the allocation candidate of the radio frequency regarding the communication of the user data between the connection base station and terminal 100B based on the information of the utilization result of the radio frequency regarding the communication of the user data of each small cell base station 200B2. Wired communicator 217 transmits the information of the allocation candidate of the radio frequency to the connection base station. Wireless transmitter 206 transmits the information of the allocation candidate of the radio frequency and the information of the wireless base station to terminal 100B.

Small cell base station 200B2 as the connection base station includes wired communicator 262, wireless resource allocation scheduler 261, and wireless receiver 253B or wireless transmitter 256B. Wired communicator 262 receives the information of the allocation candidate (RB) of the radio frequency from macrocell base station 200A2. Wireless resource allocation scheduler 261 determines whether or not the wireless resource in the radio frequency of the allocation candidate is able to be allocated. In a case where the radio frequency of the allocation candidate is able to be allocated, wireless receiver 253B or wireless transmitter 256B transmits the allocation information of the wireless resource to terminal 100B. Wireless receiver 253B or wireless transmitter 256B communicates the user data by using the wireless resource of the radio frequency.

Terminal 100B includes wireless receiver 108 and wireless receiver 115B. Wireless receiver 108 receives the information of the allocation candidate of the radio frequency and the information of the connection base station from macrocell base station 200A2. Wireless receiver 115B receives the allocation information of the wireless resource from small cell base station 200B2. Wireless transmitter 112B or wireless receiver 115B communicates the user data by using the wireless resource of the radio frequency.

Accordingly, according to wireless communication system 10B and macrocell base station 200A2, macrocell base station 200A2 collectively allocates the radio frequencies to the communication between small cell base stations 200B2 and terminals 100B subordinate to the macrocell base station. Accordingly, in the heterogeneous network having different wireless communication methods or characteristics of different base stations 200, it is possible to efficiently allocate the radio frequencies to each terminal 100B and each small cell base station 200B2, and it is possible to reduce complicatedness required in the allocation of the radio frequency.

Wireless communication system 10B or macrocell base station 200A2 can reduce the occurrence of the communication interference between the wireless communication system or the macrocell base station and peripheral base station 200. Thus, the number of times the wireless resource allocation operation is repeated is reduced, and thus, it is possible to shorten a time required in the allocation of the wireless resource in terminal 100B or small cell base station 200B2. That is, it is possible to improve allocation efficiency of the wireless resource.

Wireless communication system 10B and macrocell base station 200A2 can improve utilization efficiency of the wireless resource without previously separating the frequency between base stations 200.

There may be a case where base station 200 according to the present exemplary embodiment includes only base stations 200 of the same communication operator and a case where base stations 200 of a plurality of different communication operators share the same wireless resource. In both cases, the plurality of small cell base stations 200B2 can allocate the wireless resource in an autonomously distributed manner without mutually sharing the information.

Macrocell base station 200A2 includes utilization history databases 213a and 215a, wired communicator 217, and first history manager 213 or second history manager 215. Utilization history database 213a and 215a accumulate the information of the utilization result of the radio frequency regarding the communication of the user data for each small cell base station 200B2. Wired communicator 217 receives the information of the utilization result including the radio frequency used in the communication of the user data and the utilization amount of the wireless resource in the radio frequency from the connection base station. First history manager 213 or second history manager 215 updates the information of the utilization results accumulated in utilization history databases 213a and 215a based on the received information of the utilization results.

Accordingly, it is possible to reflect the latest utilization result, for example, whenever small cell base station 200B2 communicates the user data with terminal 100B. Accordingly, it is possible to improve the allocation efficiency or the utilization efficiency of the wireless resource.

In macrocell base station 200A2, first frequency candidate determiner 214 or second frequency candidate determiner 216 preferentially extracts the radio frequency of which the utilization result is larger than a predetermined criterion, as the allocation candidate of the radio frequency.

Accordingly, since terminal 100B is able to allocate the wireless resource having a high possibility that the communication of the user data will succeed, it is possible to improve communication accuracy of the user data.

The utilization result of the radio frequency includes a data communication amount using the radio frequency, a data communication time using the radio frequency, or the number of times of data communication using the radio frequency.

In macrocell base station 200A2, wired communicator 217 receives the change request of the connection base station from the connection base station. Connection base station determiner 211 extracts another connection base station as small cell base station 200B2 communicating the user data with terminal 100B.

Accordingly, even in a case where there is no empty in the designated radio frequency, macrocell base station 200A2 designates another connection base station again, and can improve a probability that the terminal 100B and the connection base station will be able to communicate the user data.

In small cell base station 200B2, in a case where the wireless resource in the radio frequency of the allocation candidate is not able to be allocated, wireless resource allocation scheduler 261 determines whether or not the wireless resource in each radio frequency is able to be allocated. In a case where another radio frequency is able to be allocated, wireless receiver 253B or wireless transmitter 256B communicates the user data by using the wireless resource of another radio frequency.

Accordingly, even in a case where there is not empty in the radio frequency designated by macrocell base station 200A2, small cell base station 200B2 designates another radio frequency again, and can improve a probability that terminal 100B and the connection base station will be able to communicate the user data.

In small cell base station 200B2, in a case where the wireless resource in another radio frequency is not able to be allocated, wired communicator 262 transmits the change request of the connection base station to macrocell base station 200A2.

Accordingly, even in a case where there is no empty in the radio frequency designated by macrocell base station 200A2, small cell base station 200B2 designates another connection base station again, and can improve a probability that terminal 100B and the connection base station will be able to communicate the user data.

As stated above, according to the first exemplary embodiment and the second exemplary embodiment, macrocell base station 200A or 200A2 can accurately determine which radio frequency (for U-plane) of which small cell base station 200B or 200B2 is to be allocated to terminal 100 or 100B.

The present disclosure is not limited to the configurations of the above-described exemplary embodiments, and any configuration may be applied as long as the configuration can achieve the functions illustrated in claims or the functions of the present exemplary embodiments.

INDUSTRIAL APPLICABILITY

The present disclosure is useful in a wireless base station, a wireless communication system, and a base station allocation method which are capable of reducing power consumption of a wireless communication terminal when the wireless base station to be connected to the wireless communication terminal is searched for.

REFERENCE MARKS IN THE DRAWINGS 10, 10B wireless communication system
21 uplink
22 downlink
23 uplink
24 downlink
50 GPS satellite
100, 100B terminal
101 GPS signal reception antenna
102 GPS receiver
103 positional information generator
104, 111, 111B transmission packet generator
105, 112, 112B wireless transmitter
106, 113 transmission antenna
107, 114 reception antenna
108, 115 wireless receiver
109, 109B, 116, 116B reception packet decoder
110, 110B wireless resource allocation manager
200 base station
200A, 200A2 macrocell base station
200B, 200B2 small cell base station
201 reception antenna
202 wireless receiver
203 reception packet decoder
204 connection base station extractor
204a small cell information database
205, 205B transmission packet generator
206 wireless transmitter
207 transmission antenna
211 connection base station determiner 212 data distributer
213 first history manager
213a utilization history database
214 first frequency candidate determiner
215 second history manager
215a utilization history database
216 second frequency candidate determiner
217 wired communicator
251 wireless resource allocation manager
252 reception antenna
253, 253B wireless receiver
254, 254B reception packet decoder
255, 255B transmission packet generator
256, 256B wireless transmitter
257 transmission antenna
261 wireless resource allocation scheduler
262 wired communicator

The invention claimed is:

1. A heterogeneous network system, comprising:
a macrocell base station;
first small cell base stations under control of the macrocell base station;
a wireless communication terminal under control of the macrocell base station; and
second small cell base stations not under control of the macrocell base station, wherein
the macrocell base station includes:
a receiver configured to receive a connection request regarding the wireless communication terminal, and to receive, from the wireless communication terminal, control data including positional information and wireless communication method information of the wireless communication terminal, wherein the wireless communication method information indicates a wireless communication method usable by the wireless communication terminal;
a processor coupled to the receiver and configured to:
select a first connection base station candidate, which performs communication of user data with the wireless communication terminal, from the first small cell base stations, based on the positional information and the wireless communication method information of the wireless communication terminal, positional information of the first small cell base stations, and information of wireless communication methods usable by the first small cell base stations,
store, in a memory device, frequency usage history indicative of frequencies respectively used by the first small cell base stations for communicating user data,
in reference to the frequency usage history, determine a first frequency candidate for use in the communication of the user data between the wireless communication terminal and the first connection base station candidate; and
a transmitter coupled to the processor and configured to transmit information regarding the first frequency candidate to the first connection base station candidate, and to transmit information regarding the first connection base station candidate and the first frequency candidate to the wireless communication terminal,
wherein the receiver is configured to receive, from the first connection base station candidate, information regarding the frequency used for the communication of the user data between the first connection base station candidate and the wireless communication terminal, and the processor is configured to update the frequency usage history based on the received information regarding the frequency,
wherein the first connection base station candidate, when no wireless resource is available in the first frequency candidate, selects a second frequency candidate, performs the communication with the wireless communication terminal using the second frequency candidate, and transmits to the macrocell base station information regarding the second frequency candidate as the frequency used for the communication,
wherein the first connection base station candidate, when no wireless resource is available in the first frequency candidate and no second frequency candidate is available, transmits to the macrocell base station a request to change a connection base station candidate,
in response to the request to change a connection base station candidate, the processor of the macrocell base station searches for a second connection base station candidate, which performs communication of the user data with the wireless communication terminal and which is other than the first connection base station candidate, from among the first small cell base stations, and
in response to the second connection base station candidate being found, the receiver of the macrocell base station receives, from the second connection base station candidate, information regarding a third frequency candidate used for the communication of the user data between the second connection base station candidate and the wireless communication terminal, and the processor of the macrocell base station updates the frequency usage history based on the received information regarding the third frequency candidate.

2. The heterogeneous network system according to claim 1, wherein the processor selects the first connection base station candidate based on a request for high-speed communication received from the wireless communication terminal.

3. The heterogeneous network system according to claim 1, wherein the processor selects the first connection base station candidate based on a type of the user data.

4. The heterogeneous network system according to claim 1, wherein the processor selects the first connection base station candidate based on a communication speed of the first connection base station candidate.

5. The heterogeneous network system according to claim 1, wherein the processor selects the first connection base station candidate based on a wireless communication standard type included in the control data received from the wireless communication terminal.

6. The heterogeneous network system according to claim 1, wherein the processor selects the first connection base station candidate based on communication content of the wireless communication terminal, which is included in the control data received from the wireless communication terminal.

7. The heterogeneous network system according to claim 1, wherein the processor selects the first connection base station candidate based on a moving speed of the wireless communication terminal.

8. The wireless base station heterogeneous network system according to claim 1, wherein the processor selects the macrocell base station itself as the first connection base station candidate in response to determining that the wireless communication terminal moves more frequently than a defined threshold and/or that an amount of the user data is less than a defined amount.

9. A base station allocation method executed in a heterogeneous network system including a macrocell base station, first small cell base stations under control of the macrocell base station, and second small cell base stations not under control of the macrocell base station, the method comprising:

the macrocell base station receiving a connection request regarding a wireless communication terminal under control of the macrocell base station;

the macrocell base station receiving, from the wireless communication terminal, control data including positional information and wireless communication method information of the wireless communication terminal, wherein the wireless communication method information indicates a wireless communication method usable by the wireless communication terminal;

the macrocell base station selecting a first connection base station candidate, which performs communication of user data with the wireless communication terminal, from the first small cell base stations, based on the positional information and the wireless communication method information of the wireless communication terminal, positional information of the first small cell base stations, and information of wireless communication methods usable by the first small cell base stations;

the macrocell base station storing, in a memory device, frequency usage history indicative of frequencies respectively used by the first small cell base stations for communicating user data;

the macrocell base station, in reference to the frequency usage history, determining a first frequency candidate for use in the communication of the user data between the wireless communication terminal and the first connection base station candidate;

the macrocell base station transmitting information regarding the first frequency candidate to the first connection base station candidate;

the macrocell base station transmitting information regarding the first connection base station candidate and the first frequency candidate to the wireless communication terminal;

the macrocell base station receiving, from the first connection base station candidate, information regarding the frequency used for the communication of the user data between the first connection base station candidate and the wireless communication terminal;

the macrocell base station updating the frequency usage history based on the received information regarding the frequency;

the first connection base station candidate, in response to no wireless resource being available in the first frequency candidate, selecting a second frequency candidate, performing the communication with the wireless communication terminal using the second frequency candidate, and transmitting to the macrocell base station information regarding the second frequency candidate as the frequency used for the communication;

the first connection base station candidate, in response to no wireless resource being available in the first frequency candidate and no second frequency candidate being available, transmitting to the macrocell base station a request to change a connection base station candidate;

the macrocell base station, in response to receiving the request to change a connection base station candidate, searching for a second connection base station candidate, which performs communication of the user data with the wireless communication terminal and which is other than the first connection base station candidate, from among the first small cell base stations; and in response to the second connection base station candidate being found, the macrocell base station receiving, from the second connection base station candidate, information regarding a third frequency candidate used for the communication of the user data between the second connection base station candidate and the wireless communication terminal, and the macrocell base station updating the frequency usage history based on the received information regarding third frequency candidate.

10. The base station allocation method according to claim 9, comprising the macrocell base station selecting the first connection base station candidate based on a request for high-speed communication received from the wireless communication terminal.

11. The base station allocation method according to claim 9, comprising the macrocell base station selecting the first connection base station candidate based on a type of the user data.

12. The base station allocation method according to claim 9, comprising the macrocell base station selecting the first connection base station candidate based on a communication speed of the first connection base station candidate.

13. The base station allocation method according to claim 9, comprising the macrocell base station selecting the first connection base station candidate based on a wireless communication standard type included in the control data received from the wireless communication terminal.

14. The base station allocation method according to claim 9, comprising the macrocell base station selecting the first connection base station candidate based on communication content of the wireless communication terminal, which is included in the control data received from the wireless communication terminal.

15. The base station allocation method according to claim 9, comprising the macrocell base station selecting the first connection base station candidate based on a moving speed of the wireless communication terminal.

16. The base station allocation method according to claim 9, comprising the macrocell base station selecting the macrocell base station itself as the first connection base station candidate in response to determining that the wireless communication terminal moves more frequently than a defined threshold and/or that an amount of the user data is less than a defined amount.

* * * * *